United States Patent
Steenstrup et al.

(10) Patent No.: US 12,216,206 B2
(45) Date of Patent: Feb. 4, 2025

(54) SONAR DATA COMPRESSION

(71) Applicant: R3VOX LTD, B'Kara (MT)

(72) Inventors: Jens Steenstrup, Austin, TX (US); Kirk Hobart, Austin, TX (US); Mark Chun, Austin, TX (US); Christopher Tiemann, Austin, TX (US); Peter Bilodeau, Austin, TX (US)

(73) Assignee: R3VOX LTD, B'Kara (MT)

( * ) Notice: Subject to any disclaimer, the term of this patent is extended or adjusted under 35 U.S.C. 154(b) by 0 days.

(21) Appl. No.: 18/137,273

(22) Filed: Apr. 20, 2023

(65) Prior Publication Data
US 2023/0266463 A1    Aug. 24, 2023

Related U.S. Application Data

(63) Continuation of application No. 16/812,286, filed on Mar. 7, 2020, now Pat. No. 11,668,820, which is a continuation of application No. 15/581,468, filed on Apr. 28, 2017, now Pat. No. 10,605,914, which is a continuation-in-part of application No. 15/476,137, filed on Mar. 31, 2017, now Pat. No. 10,132,924.

(60) Provisional application No. 62/329,631, filed on Apr. 29, 2016.

(51) Int. Cl.
| | | |
|---|---|---|
| G01S 15/00 | (2020.01) | |
| G01S 7/52 | (2006.01) | |
| G01S 7/534 | (2006.01) | |
| G01S 15/32 | (2006.01) | |
| G01S 15/58 | (2006.01) | |
| G01S 15/89 | (2006.01) | |

(52) U.S. Cl.
CPC ...... *G01S 15/8902* (2013.01); *G01S 7/52003* (2013.01); *G01S 7/534* (2013.01); *G01S 15/32* (2013.01); *G01S 15/325* (2013.01); *G01S 15/586* (2013.01); *G01S 15/89* (2013.01)

(58) Field of Classification Search
USPC .......................................... 367/88
See application file for complete search history.

(56) References Cited

U.S. PATENT DOCUMENTS

| | | | |
|---|---|---|---|
| 3,144,631 A | 8/1964 | Lustig et al. | |
| 5,483,499 A | 1/1996 | Brumley et al. | |
| 6,285,628 B1 | 9/2001 | Kiesel | |
| 6,839,303 B2* | 1/2005 | Handa ................. | G10K 11/341 367/103 |
| 6,987,707 B2* | 1/2006 | Feintuch ................ | G01S 15/04 367/87 |

(Continued)

FOREIGN PATENT DOCUMENTS

CN    100360941 C    1/2008

OTHER PUBLICATIONS

Marek Moszynski et al.: "A novel method for archiving multibeam sonar data with emphasis on efficient record size reduction and storage", Polish Maritime Research, vol. 20, No. 1, Jan. 1, 2013, pp. 77-86, XP055654170, ISSN: 1233-2585, DOI: 10.2478/pomr-2013-0009.

(Continued)

*Primary Examiner* — James R Hulka
(74) *Attorney, Agent, or Firm* — Paul D. Chancellor; Ocean Law

(57) ABSTRACT

A survey system including a multibeam echo sounder and a beam selector for selecting beams with the largest amplitudes.

20 Claims, 24 Drawing Sheets

(56) References Cited

U.S. PATENT DOCUMENTS

| | | | |
|---|---|---|---|
| 7,092,440 B1 | 8/2006 | Dress, Jr. et al. | |
| 8,305,841 B2 | 11/2012 | Riordan et al. | |
| 8,317,706 B2* | 11/2012 | Wegener | A61B 8/13 600/443 |
| 9,091,790 B2* | 7/2015 | Caute | G01S 7/003 |
| 9,244,168 B2 | 1/2016 | Proctor | |
| 9,448,300 B2* | 9/2016 | Jansen | G01S 13/34 |
| 10,605,914 B2 | 3/2020 | Steenstrup | |
| 10,718,865 B2* | 7/2020 | Sloss | G01S 15/8961 |
| 10,816,652 B2* | 10/2020 | Sloss | G01S 7/526 |
| 11,054,521 B2* | 7/2021 | Steenstrup | G01S 7/521 |
| 11,079,490 B2* | 8/2021 | Steenstrup | G10K 11/346 |
| 11,158,335 B1* | 10/2021 | Ganguly | G10L 15/22 |
| 11,428,810 B2* | 8/2022 | Steenstrup | G01S 15/89 |
| 11,668,820 B2* | 6/2023 | Steenstrup | G01S 15/89 367/88 |
| 11,774,587 B2* | 10/2023 | Steenstrup | G01S 15/325 367/88 |
| 11,846,703 B2* | 12/2023 | Steenstrup | H04L 27/2601 |
| 11,846,705 B2* | 12/2023 | Steenstrup | G10K 11/346 |
| 2003/0235112 A1* | 12/2003 | Zimmerman | G01S 7/521 367/4 |
| 2004/0037166 A1* | 2/2004 | Handa | G10K 11/341 367/103 |
| 2005/0058021 A1* | 3/2005 | Feintuch | G01S 15/04 367/99 |
| 2010/0067330 A1* | 3/2010 | Collier | G01S 15/42 367/88 |
| 2010/0157736 A1* | 6/2010 | Riordan | G01S 15/8902 367/88 |
| 2010/0331689 A1 | 12/2010 | Wegener | |
| 2011/0202278 A1 | 8/2011 | Caute et al. | |
| 2015/0331104 A1* | 11/2015 | Proctor | G01S 15/8902 367/88 |
| 2015/0346321 A1* | 12/2015 | Jansen | H03M 7/30 342/107 |
| 2017/0315237 A1* | 11/2017 | Steenstrup | G01S 15/586 |
| 2019/0079185 A1* | 3/2019 | Steenstrup | G06F 18/00 |
| 2019/0154827 A1* | 5/2019 | Steenstrup | G01S 15/32 |
| 2019/0265343 A1* | 8/2019 | Sloss | G01S 15/06 |
| 2019/0346565 A1* | 11/2019 | Sloss | G01S 15/42 |
| 2020/0264304 A1* | 8/2020 | Steenstrup | G01S 15/8902 |
| 2020/0363526 A1* | 11/2020 | Steenstrup | G01S 7/54 |
| 2021/0286074 A1* | 9/2021 | Steenstrup | G01S 15/102 |
| 2021/0325533 A1* | 10/2021 | Steenstrup | G01S 7/52003 |
| 2021/0341601 A1* | 11/2021 | Steenstrup | G01S 15/586 |

OTHER PUBLICATIONS

Andrzej Chybicki et al.: "Application of compression techniques for reducing the size of multibeam sonar records", Information Technology, 2008. IT 2008. 1st International Conference on, IEEE, Piscataway, NJ, USA. May 18, 2008, pp. 1-4, XP031319263, ISBN: 978-1-4244-9.

Rolf J. Korneliussen et al.: "Processing 4-D Acoustic Data From The Worlds Most Advanced Multi-Beam Fisheries Sonar", Proceedings of the 30th Scandinavian Symposium on Physical Acoustics, Jan. 31, 2007, XP055653911.

\* cited by examiner

| SYMBOL | DESCRIPTION |
|---|---|
| AD | Analog to digital converter |
| BF | Beamformer |
| ESx | Sensor x |
| MF | Matched filter |
| PA | Power amplifier |
| PRO | Processor |
| SG | Signal generator |
| ▽ | Amplifier |
| (lowpass symbol) | Antialiasing filter |
| (bandpass symbol) | Band pass filter |
| (down arrow) | Decimator |
| ⊗ | Mixer |

FIG. 3E

300E $\beta\beta$ $B_{1,1}$  $B_{1,2}$  $B_{1,3}...$  $B_{1,16}$  $\left[\begin{array}{c} \alpha_{12}|B_{1,12}|, \alpha_{1}|B_{1,1}| \\ \alpha_{15}|B_{2,15}|, \alpha_{9}|B_{2,9}| \\ \cdot \\ \alpha_{13}|B_{s,13}|, \alpha_{5}|B_{s,5}| \end{array}\right]$ $B_{2,1}$  $B_{2,2}$  $B_{2,3}...$  $B_{2,16}$ $\cdot$ $\cdot$ $\cdot$ $\cdot$ $B_{s,1}$  $B_{s,2}$  $B_{s,3}...$  $B_{s,16}$

400A 16   13         7      3  2  1

400B $$\begin{matrix} B_{1,7} & B_{1,8} & B_{1,9}... & B_{1,13} \\ B_{2,7} & B_{2,8} & B_{2,9}... & B_{2,13} \\ . & . & . & . \\ B_{s,7} & B_{s,8} & B_{s,9}... & B_{s,13} \end{matrix} \quad \begin{matrix} \beta \\ \alpha_{13} \ |B_{1,13}| \\ \alpha_{9} \ \ |B_{2,9}| \\ . \\ \alpha_{12} \ |B_{s,12}| \end{matrix}$$

16      9 8      3 2 1

$$\begin{matrix} B_{1,1} & B_{1,2} & B_{1,3}... & B_{1,8} \\ B_{2,1} & B_{2,2} & B_{2,3}... & B_{2,8} \\ \cdot & \cdot & \cdot & \cdot \\ B_{s,1} & B_{s,2} & B_{s,3}... & B_{s,8} \end{matrix} \quad \overset{\beta p}{\begin{bmatrix} \alpha_7 \ |B_{1,7}| \\ \alpha_5 \ |B_{2,5}| \\ \cdot \\ \alpha_2 \ |B_{s,2}| \end{bmatrix}}$$

400E

| $B_{1,9}$ | $B_{1,10}$ | $B_{1,11}...$ | $B_{1,16}$ | $\alpha_{12}$ $\|B_{1,12}\|$ |
| $B_{2,9}$ | $B_{2,10}$ | $B_{2,11}...$ | $B_{2,16}$ | $\alpha_{13}$ $\|B_{2,13}\|$ |
| . | . | . | . | . |
| $B_{s,9}$ | $B_{s,10}$ | $B_{s,11}...$ | $B_{s,16}$ | $\alpha_{10}$ $\|B_{s,10}\|$ |

| Multi-Spectral Surveys | MULTI-SPECTRAL MESSAGE CONTENT | | | MESSAGE CONSTRUCTION | | |
|---|---|---|---|---|---|---|
| | Low Band -higher range/ penetration -less angular resolution | Intermediate Band(s) | High Band -lower range -more angular resolution | Single Ping Serial | Single Ping Parallel | Multi Ping |
| 1) Bathymetry Long Swath/Low Angular Res. + Bathymetry Short Swath/High Angular Res. | CW, FM | No | CW, FM | X | X | X |
| 2) Seafloor Characterization Low Band + Seafloor Characterization High Band | CW | Yes | CW | X | X | X |
| 3) Seafloor Characterization + Bathymetry | CW | Yes | FM | X | X | X |
| 4) Doppler Navigation + Multi-fan Bathymetry | PC | No | OSS | X | | X |
| 5) Sub Bottom Profiling + Bathymetry | CW | Yes | CW, FM | | X | X |
| 6) Water Column + Water Column | CW, FM | Yes | CW, FM | X | X | X |
| 7) Water Column + Bathymetry | CW, FM | Yes | CW, FM | X | X | X |

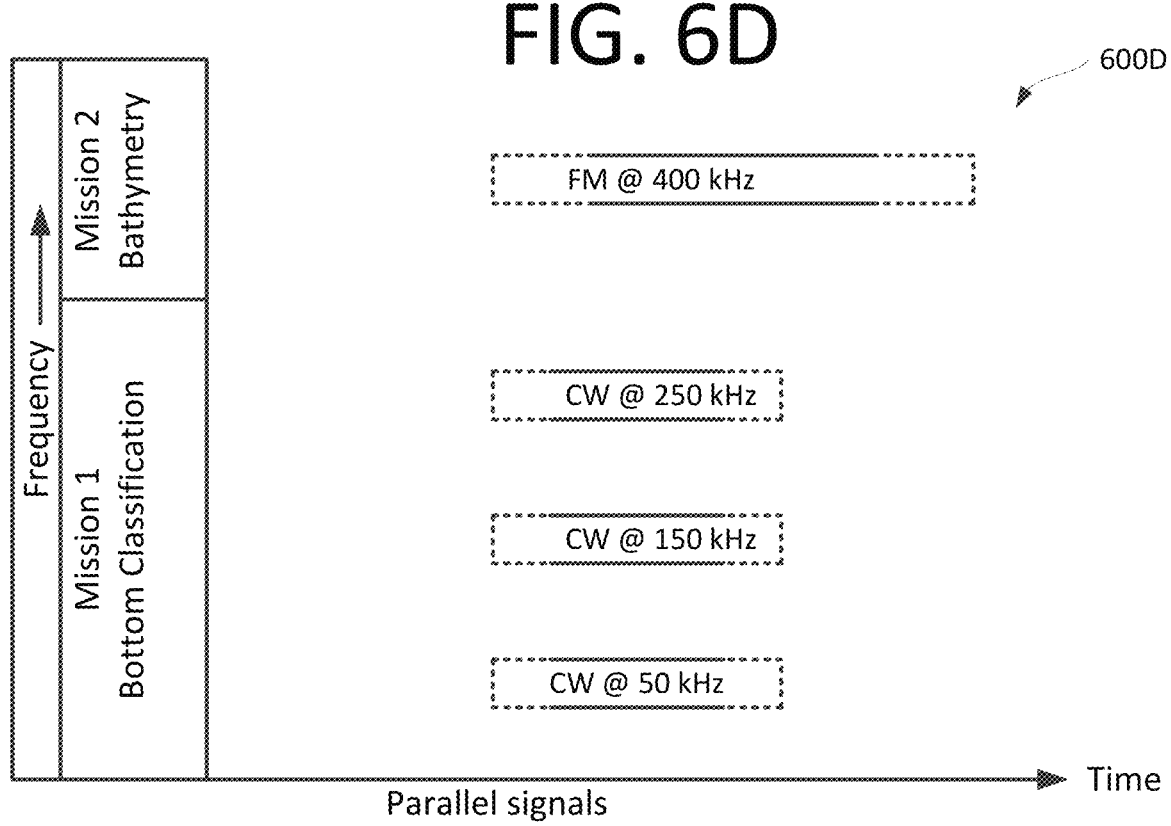
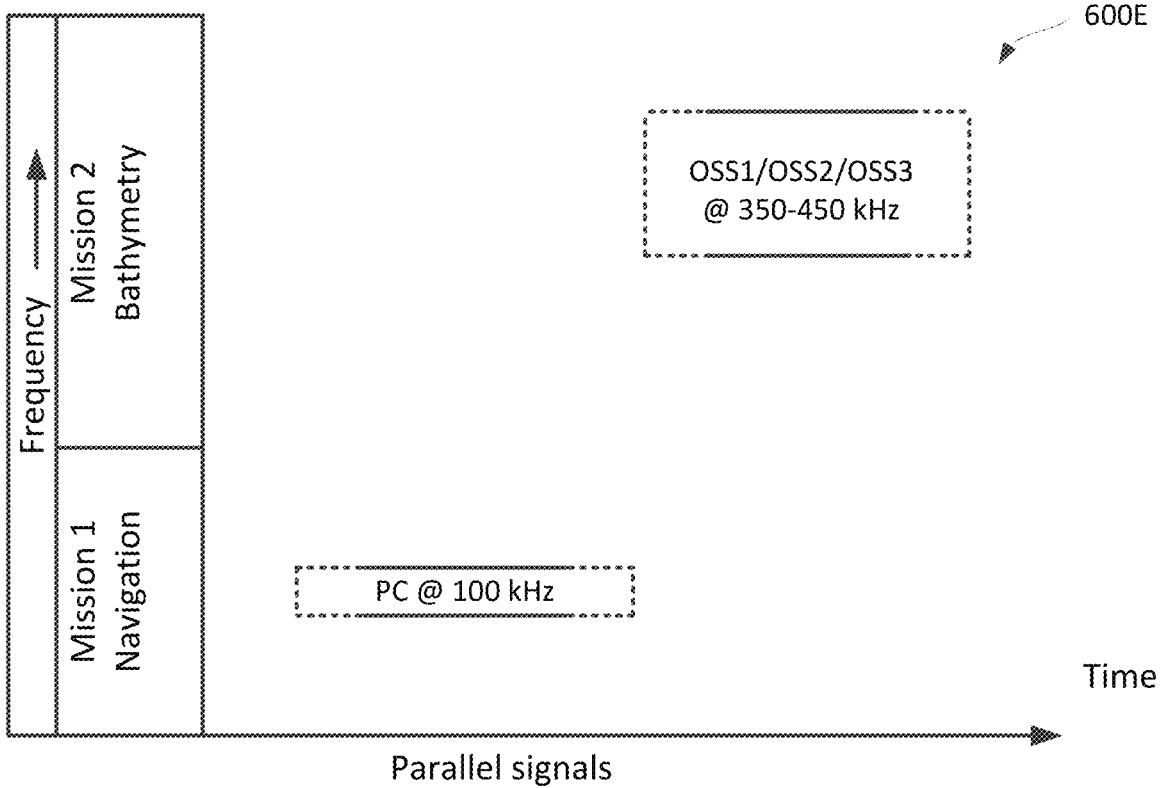

SONAR DATA COMPRESSION

INCORPORATION BY REFERENCE

This application is a continuation of U.S. patent application Ser. No. 16/812,286 filed Mar. 7, 2020 which is a continuation of U.S. patent application Ser. No. 15/581,468 filed Apr. 28, 2017 which is a continuation in part of U.S. patent application Ser. No. 15/476,137 filed Mar. 31, 2017, now U.S. Pat. No. 10,132,924, which claims the benefit of U.S. Prov. Pat. App. No. 62/329,631 filed Apr. 29, 2016 both of which are included herein in their entireties and for all purposes. This application incorporates by reference, in their entireties and for all purposes, the disclosures of U.S. Pat. No. 3,144,631 concerning Mills Cross sonar, U.S. Pat. No. 5,483,499 concerning Doppler frequency estimation, U.S. Pat. No. 7,092,440 concerning spread spectrum communications techniques, U.S. Pat. No. 8,305,841 concerning sonar used for mapping seafloor topography, and U.S. Pat. No. 9,244,168 concerning frequency burst sonar.

BACKGROUND OF THE INVENTION

Field of the Invention

The present invention relates to underwater acoustical systems, methods for using underwater acoustical systems, and methods for processing and using the data they produce.

Discussion of the Related Art

A month after the Titanic struck an iceberg in 1912, English meteorologist Lewis Richardson filed a patent at the British Patent Office for an underwater ranging device. Modern day successors to Richardson's invention are often referred to as SONAR (sound navigation and ranging) devices. Among these devices are ones using transducer arrays to project sound or pressure waves through a liquid medium and transducer arrays to receive corresponding echoes from features that scatter and/or reflect impinging waves.

Information about these features and their environment can be derived from the echoes. For example, bathymetric surveys provide information about the depth of scattering centers, water column surveys provide information about scattering centers in the water column, and seafloor characterization surveys provide information about scattering centers at the seafloor surface and below the seafloor surface.

SUMMARY OF THE INVENTION

The present invention provides a survey system.

In an embodiment, a sonar data compression system including a multibeam echo sounder for installation on a water going vehicle, the sonar data compression system comprising: an acoustic transceiver for use with one or more transducers in a single projector array and plural transducers in a single hydrophone array; the projector array arranged with respect to the hydrophone array to form a Mills Cross; a transceiver for synthesizing a transmitter message, the message exciting a projector array such that a swath beneath the vehicle is ensonified; Q beams formed by the hydrophone array, the Q beams sampled 1, 2, 3 . . . s times during a time that echoes from the message reach the hydrophones; and, for each of the times that the beams are sampled, the beam with the largest magnitude $ß_{x1}$ is identified as a characterizing beam; wherein the data associated with the characterizing beams are used as a compressed characterization of the ensonified region. And in an embodiment, the sonar data compression system wherein: for each of the times that the beams are sampled, the beam with the second largest magnitude $ß_{x2}$ is identified as a characterizing beam. And in an embodiment, the sonar data compression system wherein: for each of the times that the beams are sampled, the beams with the largest N magnitudes $ß_{x1}$ . . . $ß_{xN}$ are identified as characterizing beams where N<Q. And in an embodiment, the sonar data compression system wherein: the hydrophone array forms Q beams, u<Q beams defines a subsector, and from the subsector N largest beam magnitudes are identified. And in an embodiment, the sonar data compression system wherein: the hydrophone array forms Q beams, two subsectors are defined from the Q beams, and from each subsector N largest beam magnitudes are identified. And in an embodiment, the sonar data compression system wherein: the hydrophone array forms Q beams, three subsectors are defined from the Q beams and from each subsector N largest beam magnitudes are identified. And in an embodiment, the sonar data compression system wherein: the hydrophone array forms Q beams, S<Q subsectors are defined from the Q beams, and from each subsector N largest beam magnitudes are identified.

In an embodiment a sonar data compression system including a multibeam echo sounder for installation on a water going vehicle, the sonar data compression system comprising: an acoustic transceiver for use with one or more transducers in a single projector array and plural transducers in a single hydrophone array; the projector array arranged with respect to the hydrophone array to form a Mills Cross; a transceiver for synthesizing a transmitter message, the message exciting a projector array such that a swath beneath the vehicle is ensonified; Q beams formed by the hydrophone array, the Q beams range gated at minimum and maximum altitudes and sampled 1, 2, 3 . . . s times during a time that echoes originating within the altitude limits reach the hydrophones; and, for each of the times that the beams are sampled, the beam with the largest magnitude $ß_{x1}$ is identified as a characterizing beam; wherein the data associated with the characterizing beams are used as a compressed characterization of the ensonified region. And in an embodiment, the sonar data compression system wherein: the transceiver synthesizes n signals, for each of the n signals the output of a respective beamformer is sampled s times during a time that echoes from the message reach the hydrophones, and for each of the times that the beams are sampled, the beam with the largest magnitude $ß_{x1}$ is identified as a characterizing beam, wherein the data associated with the characterizing beams are used as a compressed characterization of the ensonified region.

In an embodiment a sonar data compression system including a multibeam echo sounder for installation on a water going vehicle, the sonar data compression system comprising: an acoustic transceiver for use with one or more transducers in a single projector array and plural transducers in a single hydrophone array; the projector array arranged with respect to the hydrophone array to form a Mills Cross; a transceiver for synthesizing a transmitter message including plural different signals SS1 . . . SSn; the transmitter message exciting a projector array such that a swath beneath the vehicle is ensonified; for each of n signals, a beamformer and a processor; for each of n beamformer outputs, the processors sample respective beams 1, 2, 3 . . . s times during a time that echoes from the message reach the hydrophones; and, for each of the times that the beams are sampled, the beam with the largest magnitude $ß_{x1}$ is identified as a characterizing beam; wherein the data associated with the characterizing beams are used as a compressed characterization of the ensonified region. And in an embodiment, the sonar data compression system wherein: for each of the sample times that the largest magnitude $ß_{x1}$ and its associated beam angle α are identified, the magnitude of beam data at the same beam angle and sample time for all other beamformer outputs are identified providing a frequency dependent comparison of returns from the same scatterers at the same time.

In an embodiment a sonar data compression system including a multibeam echo sounder for installation on a water going vehicle, the sonar data compression system comprising: an acoustic transceiver for use with one or more transducers in a single projector array and plural transducers in a single hydrophone array; the projector array arranged with respect to the hydrophone array to form a Mills Cross; a transceiver for synthesizing a transmitter message, the message exciting a projector array such that a swath beneath the vehicle is ensonified; Q beams formed by the hydrophone array, the Q beams sampled 1, 2, 3 . . . s times during a time that echoes from the message reach the hydrophones; for each of the times that the Q beams are sampled, the beams with the largest N<Q magnitudes $ß_{x,N}$ are identified as characterizing beams associated with angle $α_{x,N}$; for each of the times that the beams are sampled, a split array phase difference technique is applied where each sub array is steered in direction $α_{x,N}$; and, where the output of the technique provides an improved estimate of echo arrival angle relative to the array face; wherein the magnitude from the characterizing beams and the improved angle estimates are used as a compressed characterization of the ensonified region. And in an embodiment, the sonar data compression system wherein: the Q beams formed by the hydrophone array are range gated at minimum and maximum altitudes and sampled 1, 2, 3 . . . s times during a time that echoes originating within the altitude limits reach the hydrophones. And in an embodiment, the sonar data compression system wherein: two subsectors are defined from the Q beams and from each subsector N<u largest beam magnitudes are identified. And in an embodiment, the sonar data compression system wherein: for each of n signals, a beamformer and a processor are used; and, for each of n beamformer outputs, the processors sample respective beams 1, 2, 3 . . . s times during a time that echoes from the message reach the hydrophones.

In an embodiment a sonar data compression system including a multibeam echo sounder for installation on a stationary platform, the sonar data compression system comprising: an acoustic transceiver for use with one or more transducers in a single projector array and plural transducers in a single hydrophone array; the projector array arranged with respect to the hydrophone array to form a Mills Cross; a transceiver for synthesizing a transmitter message, the message exciting a projector array such that a swath is ensonified; Q beams formed by the hydrophone array, the Q beams sampled 1, 2, 3 . . . s times during a time that echoes from the message reach the hydrophones; and, for each of the times that the beams are sampled, the beam with the largest magnitude $ß_{x1}$ is identified as a characterizing beam; wherein the data associated with the characterizing beams are used as a compressed characterization of the ensonified region. And in an embodiment, the sonar data compression system wherein: for each of the times that the Q beams are sampled, the beams with the largest N<Q magnitudes $ß_{x,N}$ are identified as characterizing beams associated with angle $α_{x,N}$; for each of the times that the beams are sampled, a split array phase difference technique is applied where each sub array is steered in direction $α_{x,N}$; and, where the output of the technique provides an improved estimate of echo arrival angle relative to the array face; wherein the magnitude from the characterizing beams and the improved angle estimates are used as a compressed characterization of the ensonified region.

As indicated herein, a variation of the method allows for extremely precise measurement of the angle to the echo, not constrained to the nominal beam directions of the beamformer. With such fine resolution in both angle and time, locations of the most important scatterers can be derived precisely regardless of how they may be distributed in the water column or sea floor. Variations of the method allow one or more peak magnitudes to be identified from one or more subsets of beams from all or a subset of samples, thus giving flexibility in the amount of information returned with each ping and the effective data compression ratio. Furthermore, the method can be applied to multiple message components per message cycle, each with a different center frequency, provided the multibeam echo sounder system supports the use of a plurality of non-overlapping frequency bands having respective center frequencies and bandwidths. This feature allows the collection of simultaneous frequency-dependent information from a set of scattering centers.

Notably, the sonar data compression system is not limited to use on a water going vehicle or any vehicle for that matter. For example, the sonar data compression system may be stationary for monitoring activity in a particular zone or area. For example, a stationary mounted MBES that provides sonar data compression for use in a diver detection system.

BRIEF DESCRIPTION OF THE DRAWINGS

The present invention is described with reference to the accompanying figures. These figures, incorporated herein and forming part of the specification, illustrate embodiments of the invention and, together with the description, further serve to explain its principles enabling a person skilled in the relevant art to make and use the invention.

FIG. 1H shows a legend of selected symbols.

FIGS. 3D-E show sonar data compression after ensonification of a fan using the survey system of FIG. 1A.

FIGS. 6A-H show sonar data compression with multispectral returns using the survey system of FIG. 1A.

DETAILED DESCRIPTION OF THE PREFERRED EMBODIMENTS

The disclosure provided in the following pages describes examples of some embodiments of the invention. The designs, figures, and description are non-limiting examples of the embodiments they disclose. For example, other embodiments of the disclosed device and/or method may or may not include the features described herein. Moreover, described features, advantages or benefits may apply to only certain embodiments of the invention and should not be used to limit the disclosed invention.

As used herein, the term "coupled" includes direct and indirect connections. Moreover, where first and second devices are coupled, intervening devices including active devices may be located therebetween.

Multibeam Echo Sounder

FIGS. 1A-E show a survey system including a multibeam echo sounder system and describe exemplary multibeam echo sounder embodiments. FIG. 1H shows a legend 100H of selected symbols appearing on FIGS. 1C-G.

Figure 1A:
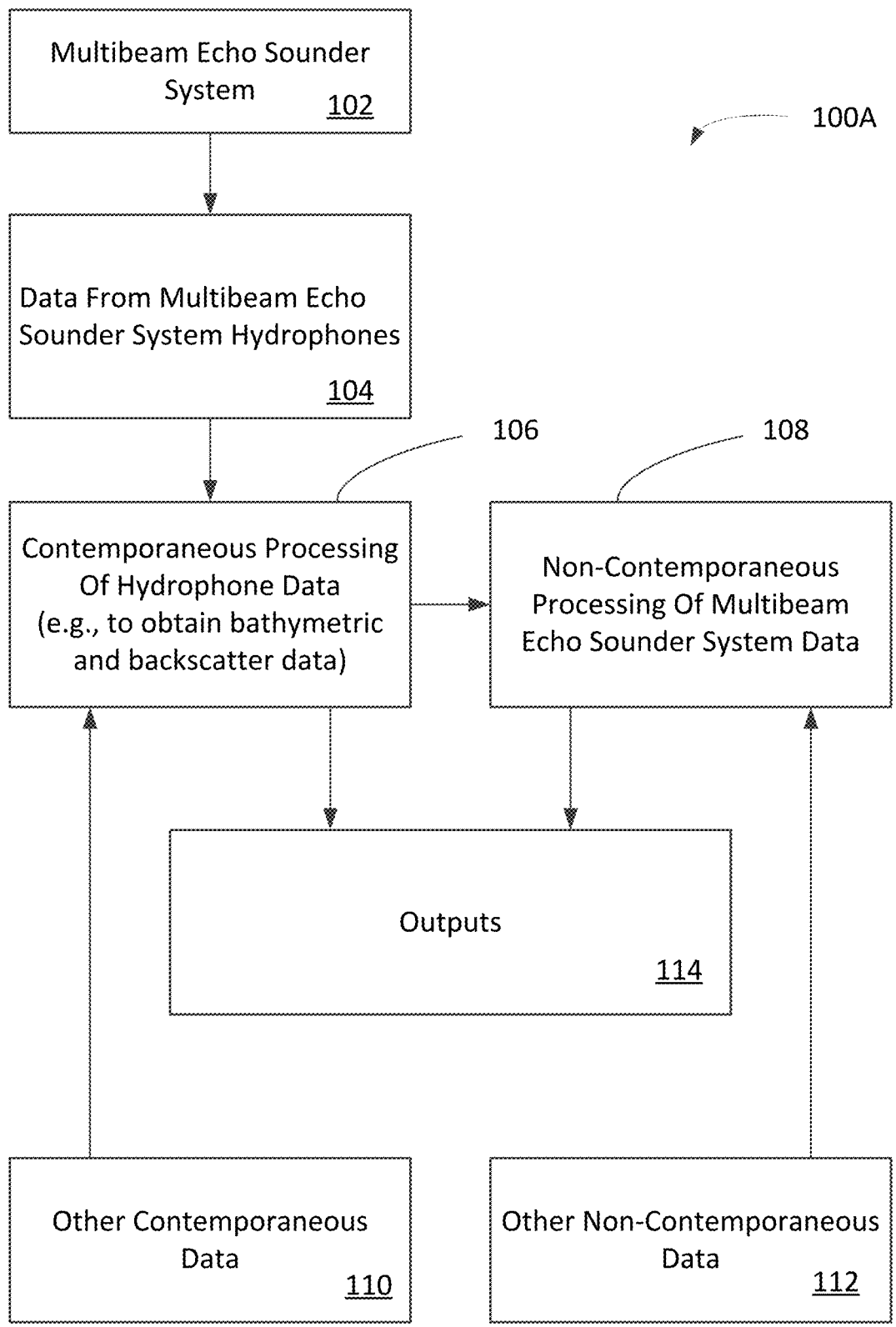
FIG. 1A shows a survey system including a multibeam echo sounder system of the present invention.

FIG. 1A shows a survey system in accordance with an embodiment of the present invention 100A. The survey system includes an echo sounder system such as a multibeam echo sounder system 102 which may be mounted on a surface vehicle or vessel, on a waterbody bottom, on a remotely operated vehicle, on an autonomous underwater vehicle, or the like. As is further described below, echo sounder and/or survey system outputs 114 may be contemporaneous with echo sounder processing of hydrophone data as in some embodiments for bathymetry or non-contemporaneous with processing of hydrophone data as in some embodiments for waterbody bottom classification.

Data acquired by multibeam echo sounder systems 104 include data from echo sounder listening devices such as hydrophones (e.g., transducers) that receive echoes which are related to the acoustic/pressure waves emanating from the echo sounder projectors but have returned by virtue of an interaction with inhomogeneities of many kinds. The interactions may take the form of reflection or scattering. The inhomogeneities, also known as reflectors and scattering centers, represent discontinuities in the physical properties of the medium. Exemplary scattering centers may be found in one or more of i) an ensonified volume of the waterbody such as a water column, ii) upon the ensonified surface of the bottom, or iii) within the ensonified volume of the sub-bottom.

Scattering centers of a biological nature may be present in the water column, as they are a part of the marine life. Scattering centers of a nonbiological nature may be present in the water column in the form of bubbles, dust and sand particles, thermal microstructure, and turbulence of natural or human origin, such as ships' wakes. Scattering centers on the surface of the bottom may be due to the mechanical roughness of the bottom, such as ripples, or be due to the inherent size, shape and physical arrangement of the bottom constituents, such as mud, sand, shell fragments, cobbles and boulders, or due to both factors. Scattering centers in the sub-bottom may be due to bioturbation of the sediments, layering of different sediment materials within the bottom or buried manmade structures such as pipelines.

Data processing within the echo sounder system may include contemporaneous processing of hydrophone data 106, for example to obtain Doppler velocity data, bathymetric data, and/or backscatter data. Data processing may also include non-contemporaneous processing of multibeam echo sounder system data 108, for example to characterize bottom conditions or the water column.

Data processing may include utilization of complementary or other data. For example, contemporaneous processing of hydrophone data 106 may utilize contemporaneous 110 and/or non-contemporaneous 112 data such as contemporaneously collected geographic positioning system ("GPS") data, sound speed measurements, attitude, and navigational information. For example, non-contemporaneous processing of echo sounder system data may utilize contemporaneous 110 and/or non-contemporaneous 112 data such as non-contemporaneously collected waterbody bottom composition data and tidal records.

Figure 1B:
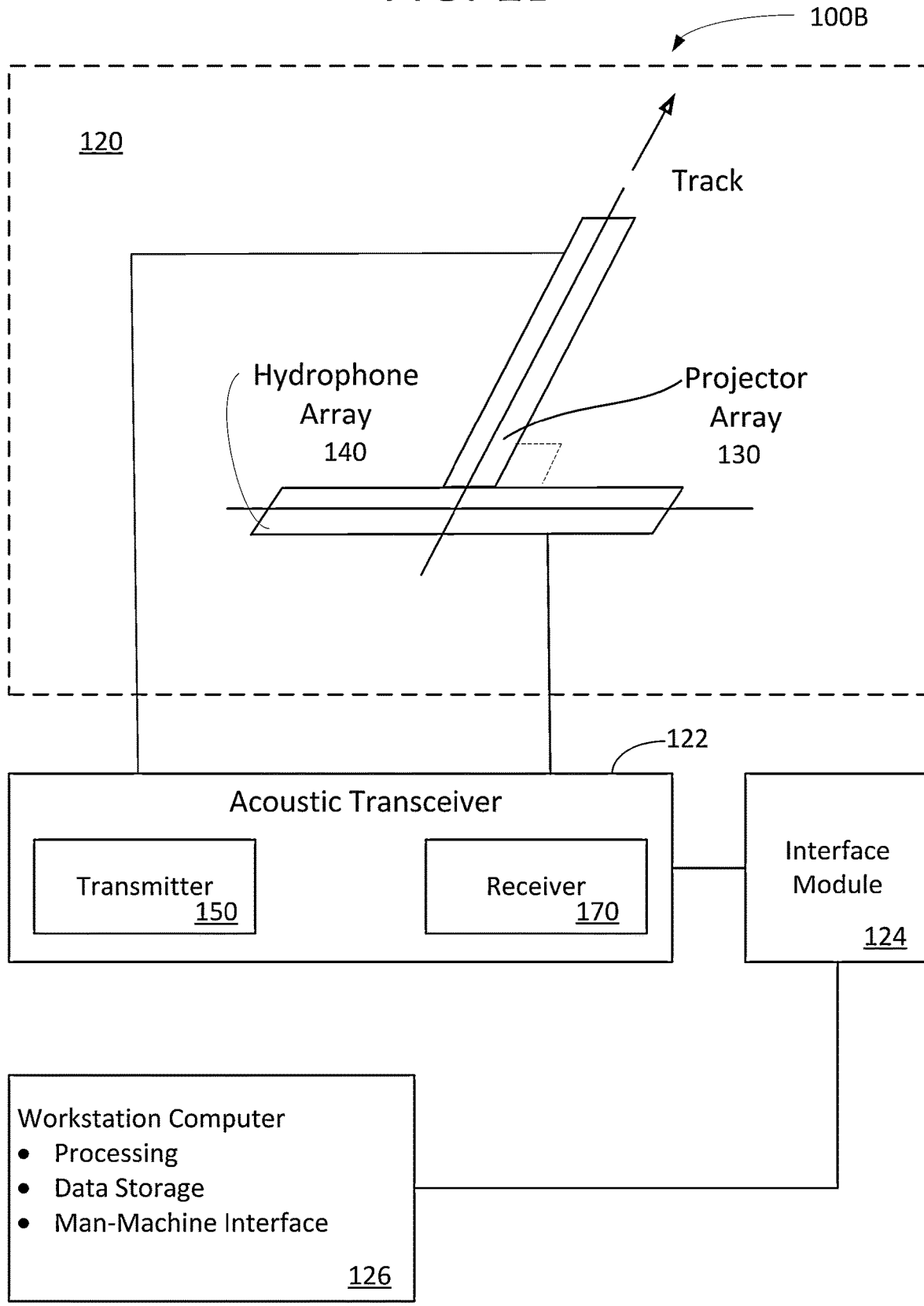
FIGS. 1B-G show embodiments of at least portions of the multibeam echo sounder system of FIG. 1A.

FIG. 1B shows portions of an exemplary multibeam echo sounder system ("MBES") 100B. The echo sounder system includes a transducer section 120 and an acoustic transceiver 122. The echo sounder system may include a transceiver interface such as an interface module 124 and/or a workstation computer 126 for one or more of data processing, data storage, and interfacing man and machine. Exemplary transducers, shown here in a Mills Cross arrangement 120, include a transmitter or projector array 130 and a receiver or hydrophone array 140. Projectors in the projector array may be spaced along a line that is parallel with a keel line or track of a vehicle or vessel to which they are mounted which may be referred to as an along track arrangement. In some embodiments, a receiver of the transceiver 122 has an operating frequency range corresponding to that of the projectors and/or the hydrophones.

During echo sounder operation, sound or pressure waves emanating from the projector array travel within a body of water and possibly within the bottom beneath the body of water and in doing so may undergo interactions, such as reflections or scattering, which disturb the propagation trajectory of the pressure waves. Some of the reflections or echoes are "heard" by the hydrophone array. See for example the disclosure of Et al, U.S. Pat. No. 3,144,631, which is included herein by reference, in its entirety and for all purposes.

The acoustic transceiver 122 includes a transmitter section 150 and a receiver section 170. The acoustic transceiver may be configured to transmit to one or more projector arrays 130 and to receive from one or more hydrophone arrays 140. Unless otherwise noted, the term transceiver does not require common packaging and/or encapsulation of the transmitter and receiver.

In various embodiments, a projector array may be a single projector array regardless of the geometry, arrangement, or quantity of devices employed. For example, where a plurality of projectors forms a plurality of spatially distinct projector groups, the plural projectors are a single projector array if they are operated to ensonify the entirety of a swath on a single ping, for example a swath of waterbody bottom or a swath of water column. In various embodiments: i) a single projector array may ensonify the entirety of a swath on a single ping; ii) a plurality of projector arrays may ensonify the entirety of a swath on a single ping; iii) a plurality of projector arrays ensonify multiple swaths on a single ping; and, iv) a plurality of projector arrays ensonify one or more swaths on multiple pings.

The echo sounder may further include a means such as an interface module 124 for interconnection with the transceiver 122. This interface module may provide, among other things, a power supply for the transceiver, communications with the transceiver, communications with the workstation computer 126, and communications with other sources of data such as a source of contemporaneous GPS data.

The workstation computer 126 may provide for one or more of data processing such as data processing for visualization of survey results, for data storage such as storage of current profiling data, bathymetry data, sound speed data, and backscatter data, for user inputs, and for display of any of inputs, system status, and survey results.

Figure 1C:
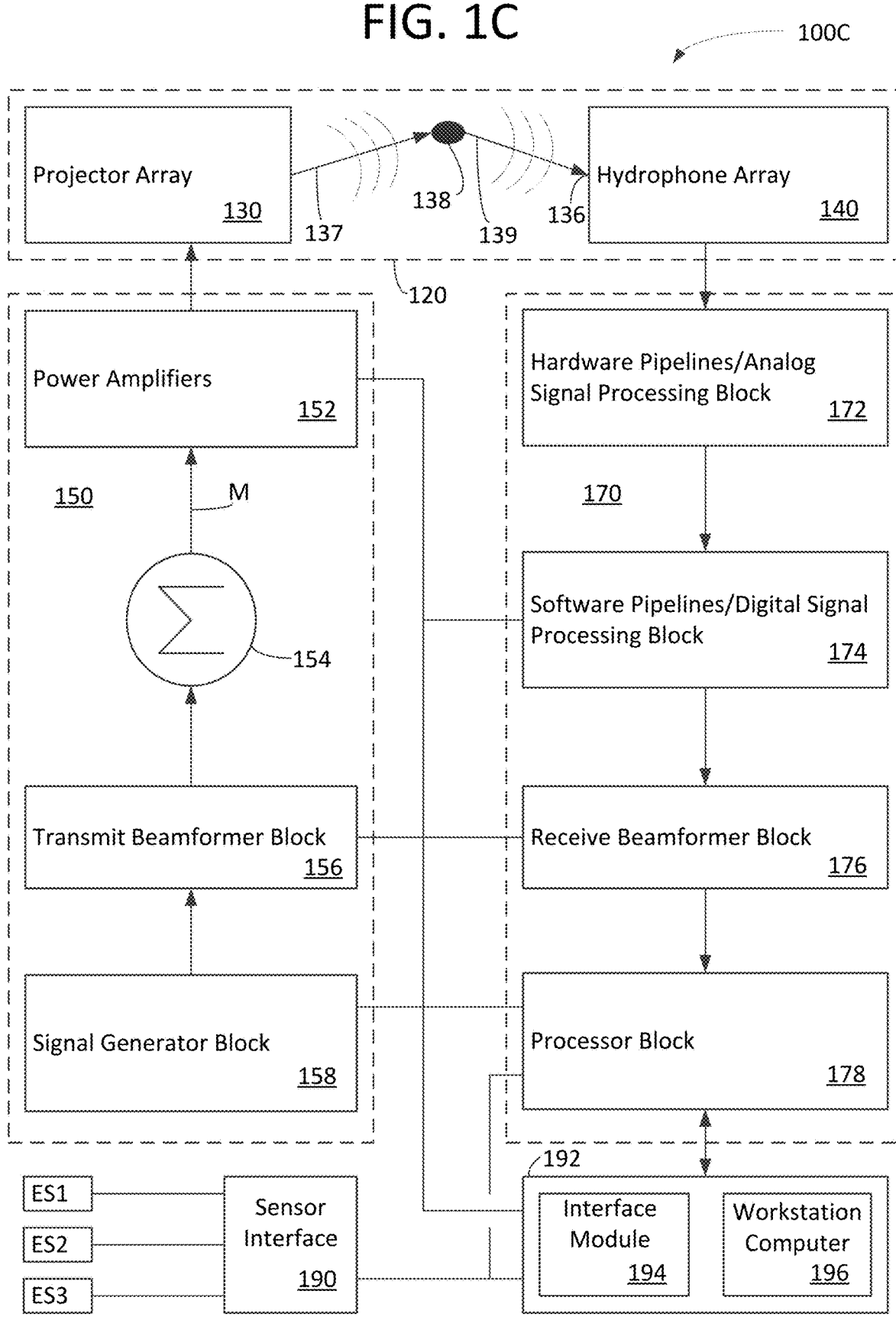

FIG. 1C shows portions of an exemplary multibeam echo sounder system ("MBES") 100C. The echo sounder system includes a transducer section 120, a transmitter section 150, and a receiver section 170. Some embodiments include a sensor interface section 190 and/or a management section 192. And in some embodiments it is the management block that signals and/or provides instructions to the signal generators 158.

The transducer section includes transducers for transmitting acoustic messages and transducers for receiving acoustic messages. For example, a transducer section may include an array of projectors 130 and an array of hydrophones 140.

Projectors in the projector array 130 may include piezoelectric elements such as ceramic elements. Element geometries may include circular and non-circular geometries such as rectangular geometries. Some projectors have an operating frequency range of about 10 kHz to 100 kHz, of about 50 kHz to 550 kHz, or about 100 to 1000 kHz.

Hydrophones in the hydrophone array 140 may include piezoelectric elements such as ceramic elements. Element geometries may include circular and non-circular geometries such as rectangular geometries. Some hydrophones have an operating frequency range of about 10 kHz to 100 kHz, of about 50 kHz to 550 kHz, or about 100 to 1000 kHz.

During operation of the projector array 130 and hydrophone array 140, the transmitter section excites the projector array, an outgoing message 137 emanates from the projector array, travels in a liquid medium to a reflector or scattering center 138, is reflected or scattered, after which a return or incoming message 139 travels to the hydrophone array 140 for processing by the receiver 170. Notably, the acoustic/pressure wave input 136 received at the hydrophone array 140 may include a Doppler shifted or otherwise modified version of the transmitted message 137 along with spurious signal and/or noise content.

The transmit section 150 may include a signal generator block 158, a transmit beamformer block 156, a summation block 154, and a power amplifier block 152. The transmit section provides for generation of or for otherwise obtaining one or more signals or message components 158 that will be used to compose a message 137. Notably, a message may be composed of multiple signals or not. Where a message is composed of multiple signals, the message may contain i) signals in parallel (superposed), ii) signals that are serialized (concatenated), or iii) may be a combination of parallel and serial signals.

The transmit beamformer block 156 receives the signal(s) from the signal generator block 158 where beamforming for each signal takes place. The beam(s) are combined in the summation block 154 to construct a parallel, serial, or combination message M. In the power amplifier block 152, the time series voltages of the message are amplified in order to excite or drive the transducers in the projector array 130. In an embodiment, each transducer is driven by a respective amplifier.

The receive section 170 includes multiple hydrophone signal processing pipelines. In an embodiment the receive section includes a hardware pipelines block/analog signal processing block 172, a software pipelines block/digital signal processing block 174, a receive beamformer block 176, and a processor block 178. The receive section provides for isolating and processing the message 137 from the input 136 received at the hydrophone array 140. For example, some embodiments process echoes to determine Doppler velocities and/or depths as a function of, among other things, round trip travel times.

In the hardware pipeline block 172, plural hydrophone array transducers of the hydrophone array 140 provide inputs to plural hardware pipelines that perform signal conditioning and analog-to-digital conversion. In some embodiments, the analog-to-digital conversion is configured for oversampling where the converter Fin (highest input frequency) is less than Fs/2 (one half of the converter sampling frequency). In an embodiment, a transceiver 122 operates with a maximum frequency of about 800 kHz. In an embodiment the transceiver utilizes analog-to-digital converters with sampling rates in a range of about 5 to 32 MHz. In an embodiment the transceiver utilizes analog-to-digital converters with sampling rates of about 5 MHz or about 32 MHz.

In the software pipeline block 174, the hardware pipelines 172 provide inputs to the software pipelines. One or more pipelines serve each of the hydrophones in the hydrophone array. Each software pipeline may provide, among other things, downconversion and/or filtering. In various embodiments, the software pipeline may provide for recovery of a message from a hydrophone input 136. In an embodiment, hydrophone may be served by pipelines for one or more of interpreting, distinguishing, deconstructing and/or decoding a message such as a multicomponent message.

In the receive beamforming or steering block 176, the software pipelines 174 provide beamformer inputs. Beamformer functionality includes phase shifting and/or time delay and summation for multiple input signals. In an embodiment, a beamformer is provided for each of multiple coded signals. For example, where software pipelines operate using two coded signals, inputs to a first beamformer are software pipelines decoding a first code and inputs to a second beamformer are software pipelines decoding a second code.

In the processor block 178, the beamformers of the beamformer block 176 provide processor inputs. Processor functionality may include any one or more of bottom detection, backscatter processing, data reduction, Doppler processing, acoustic imaging, and generation of a short time series of backscatter sometimes referred to as "snippets."

In an embodiment, a management section 192 and a sensor interface section 190 are provided. The management section includes an interface module 194 and/or a workstation computer 196. The sensor interface section provides for interfacing signals from one or more sensors ES1, ES2, ES3 such as sensors for time (e.g. GPS), motion, attitude, and sound speed.

In various embodiments, control and/or control related signals are exchanged between the management section 192 and one or more of the power amplifier block 152, software pipelines block 174, transmit beamformer block 156, receive beamformer block 176, signal generator block 158, processor block 178. And, in various embodiments sensor interface section data 190 are exchanged with the management section 192 and the processor block 178.

Figure 1D:
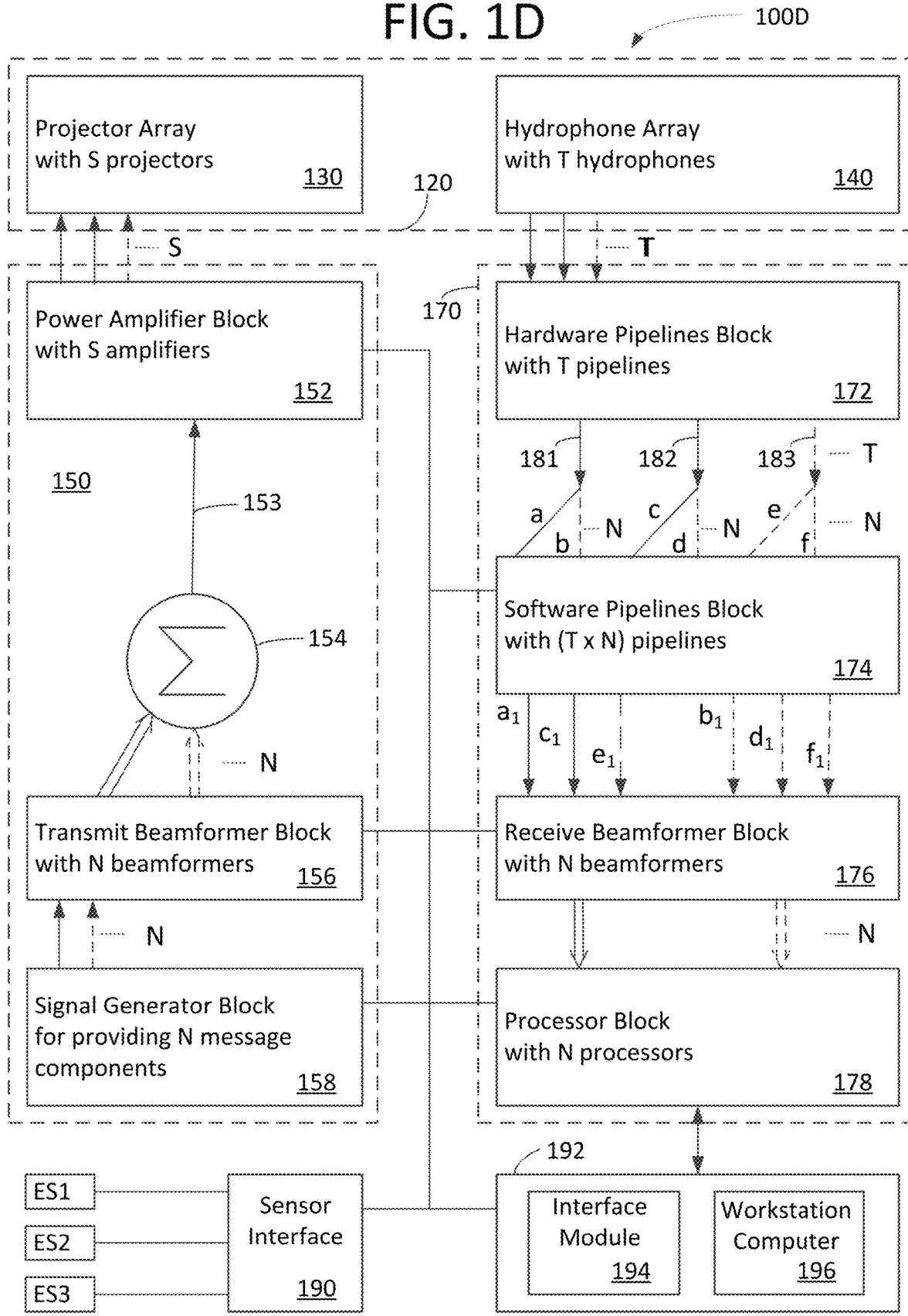

FIG. 1D shows portions of an exemplary multibeam echo sounder system ("MBES") 100D. The echo sounder system includes a transducer section 120, a transmitter section 150, and a receiver section 170. Some embodiments include an interface section 190 and/or a management section 192.

In the embodiment shown, a message 153 incorporating quantity N signals, for example N coded signals, is used to excite plural projectors in a projector array and a receiver having quantity T hardware or software pipelines and (T*N) hardware or software pipelines may be used to process T hydrophone signals for recovery of echo information specific to each of the N coded signals.

The transmitter section 150 is for exciting the projector array 130. The section includes a signal generator block 158, a transmit beamformer block 156, a summation block 154, and a power amplifier block 152.

The signal generator block 158 may generate quantity N signals or message components, for example N coded signals (e.g., Scd1 . . . ScdN). In some embodiments, each of plural signals within a message shares a common center frequency and/or a common frequency band. And, in some embodiments, each of plural signals within a message has a unique, non-overlapping frequency band.

A transmit beamformer block 156 receives N signal generator block outputs. For each of the N signals generated, the beamformer block produces a group of output beam signals such that there N groups of output beam signals.

The summation block 154 receives and sums the signals in the N groups of output beams to provide a summed output 153.

The power amplifier block 152 includes quantity S amplifiers for driving respective projectors in the projector array 130. Each power amplifier receives the summed output or a signal that is a function of the summed output 153, amplifies the signal, and drives a respective projector with the amplified signal.

An array of quantity T hydrophones 140 is for receiving echoes of acoustic/pressure waves originating from the projector array 130. The resulting hydrophone signals are processed in the receiver section 170 which includes a hardware pipeline block 172, a software pipeline block 174, a receive beamformer block 176, and a processor block 178.

In the hardware pipeline block 172, T pipelines provide independent signal conditioning and analog-to-digital conversion for each of the T hydrophone signals.

In the software pipeline block 174, (T*N) software pipelines may provide downconversion and/or filtering for each of the T hardware pipeline outputs. Means known in the art, for example filtering such as band pass filtering, may be used to distinguish different signals such as signals in different frequency bands. As shown, each of T hardware pipeline outputs 181, 182, 183 provides N software pipeline inputs a,b and c,d and e,f (i.e., 3*2=6 where T=3 and N=2).

In the receive beamformer block 176, (T*N) software pipeline block 174 outputs are used to form N groups of beams. A beamformer is provided for each of N codes. For example, where there are T=3 hydrophones and software pipelines process N=2 codes, inputs to a first beamformer are software pipelines processing the first code a1, c1, e1 and inputs to a second beamformer are software pipelines processing the second code b1, d1, f1.

In the processor block 178, N processors receive respective groups of beams formed by the beamformer block 176. Processor block 178 data are exchanged with a management section 192 and sensor interface 190 data ES1, ES2, ES3 are provided to the management section and/or the processor block.

In various embodiments control signals from the management block 192 are used to make power amplifier block 152 settings (e.g., for "S" power amplifiers for shading), to control transmit 156 and receive 176 beamformers, to select software pipeline block 174 operating frequencies, and to set signal generator block 158 operating frequencies.

As the above illustrates, the disclosed echo sounder transmitter may construct a message incorporating N components such as N coded signals. And, the echo sounder may utilize a receiver having T hardware pipelines and (T*N) software pipelines to process T hydrophone signals for recovery of echo information specific to each of the N message components.

Figure 1E:
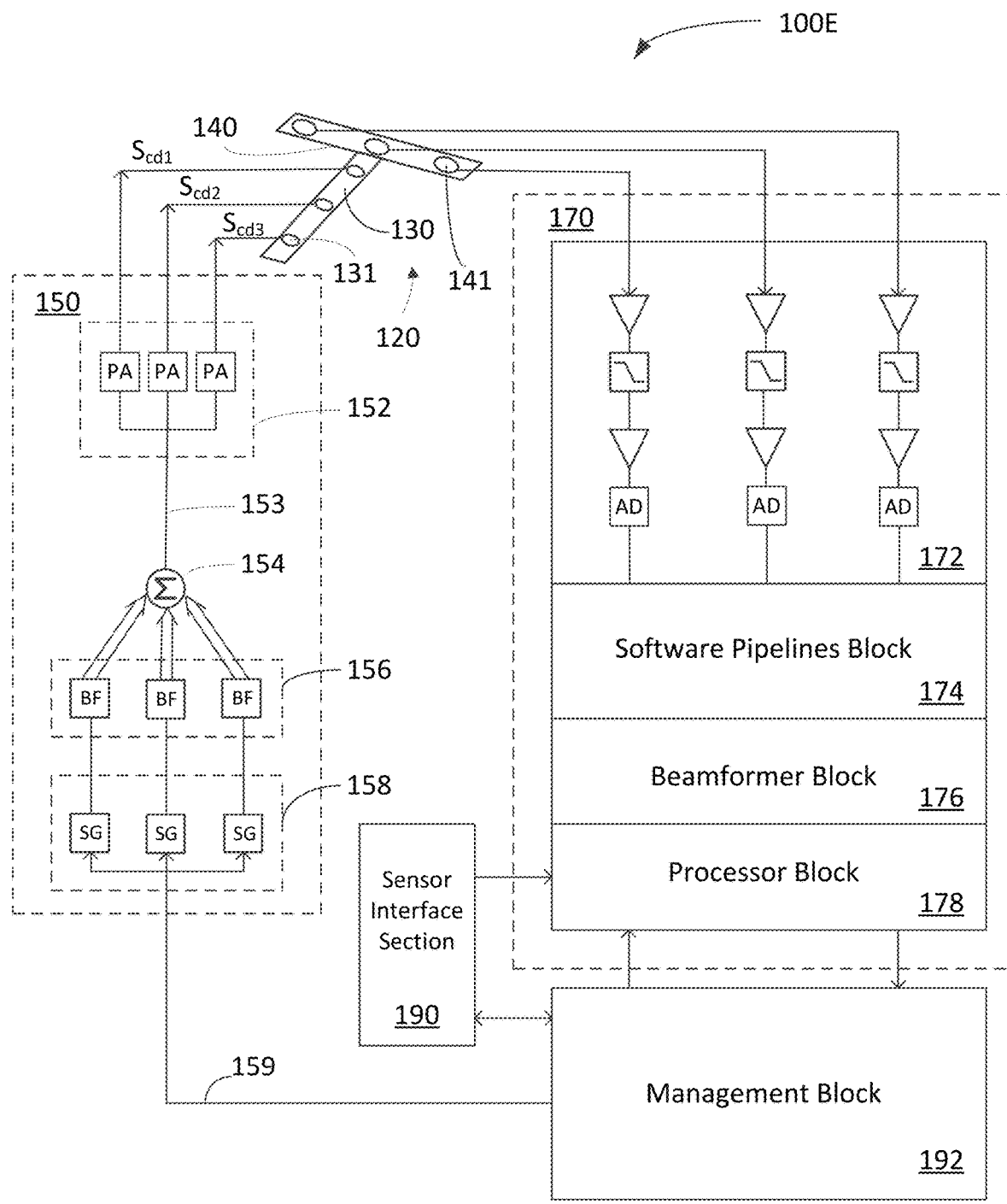
Figure 1F:
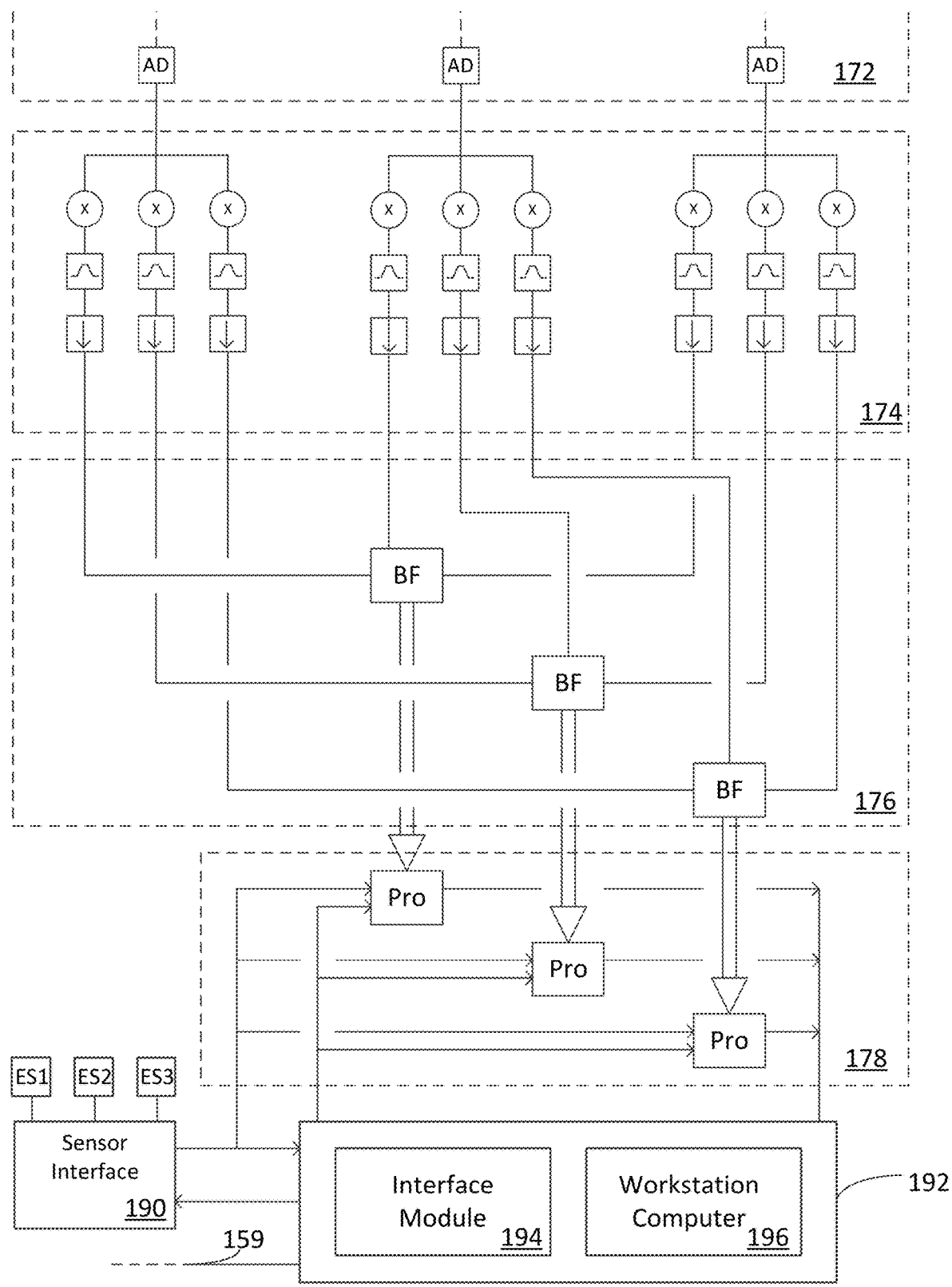

FIGS. 1E-F show portions of an exemplary multibeam echo sounder system ("MBES") 100E-F. See FIG. 1H for nomenclature 100H. The echo sounder system includes a transducer section 120, a transmitter section 150, and a receiver section 170. Some embodiments include an interface section 190 and/or a management section 192.

In the embodiment shown, a message 153 incorporating first, second, and third message components such as coded signals Scd1, Scd2, Scd3 where N=3 is used to excite three projectors in a projector array, and a receiver having three hardware pipelines and nine software pipelines is used to process three hydrophone signals T=3 to recover echo information specific to each of the N message components.

The transmitter section 150 is for exciting the projector array 130. The section includes a signal generator block 158, a transmit beamformer block 156, a summation block 154, and a power amplifier block 152.

In the signal generator block 158, signals are constructed, generated, recalled and/or otherwise provided. Here, an exemplary process is depicted with e.g., N=3 signal generators. In respective beamformers of the beamformer block 156, multiple beams are generated from each signal. In a summation block 154, the beams are combined to produce a summation block output signal or transmit message 153.

The transducer block 120 includes a projector array 130 and a hydrophone array 140 arranged, for example, as a Mills Cross. As shown, there are three projectors 131 in the projector array and three hydrophones 141 in the hydrophone array. In the power amplifier block 152, the summed signal or transmit message 153 is an input to power amplifiers driving respective projectors.

Applicant notes that for convenience of illustration, the projector and hydrophone counts are limited to three. As skilled artisans will appreciate, transducer arrays do not require equal numbers of projectors and hydrophones nor do the quantities of either of these types of transducers need to be limited to three. For example, a modern multibeam echo sounder might utilize 1 to 96 or more projectors and 64 to 256 or more hydrophones.

The array of T=3 hydrophones 141 is for receiving echoes resulting from the acoustic/pressure waves originating from the projector array 130. The resulting hydrophone signals are processed in the receiver section 170 which includes a hardware pipeline block 172, a software pipeline block 174, a receive beamformer block 176, and a processor block 178.

In the hardware pipelines block 172, each of T=3 hardware pipelines processes a respective hydrophone 141 signal through analog components including an analog-to-digital converter. In the embodiment shown, a hardware pipeline provides sequential signal processing through a first amplifier, an anti-aliasing filter such as a low pass anti-aliasing filter, a second amplifier, and an analog-to-digital converter.

In the software pipelines block 174, each of the T=3 hardware pipeline outputs is processed through N=3 software pipelines with downconversion and band pass filtering. In the embodiment shown, a software pipeline provides sequential signal processing including processing through a mixer (an oscillator such as local oscillator may be coupled to the mixer), a bandpass filter, and a decimator. Communications may occur via communications links between any of the processor block 178, the signal generator block 158, the hardware pipelines block 172, the software pipelines block 174, the and the beamformer block 176. See for example FIGS. 1C-D.

Each software pipeline may have a single mixer and/or each hardware pipeline may have no mixer. A processor 178 may control gain of a first and/or a second hardware pipeline amplifier. A processor may provide for tuning, for example via a processor controlled oscillator coupled with a mixer.

In the receive beamformer block 176, each of N=3 beamformers processes signals. As such, i) a first set of three software pipeline outputs corresponding to a first coded signal are processed by a first beamformer, ii) a second set of three software pipeline outputs corresponding to a second coded signal are processed by a second beamformer, and (iii) a third set of three software pipeline outputs corresponding to a third coded signal are processed by a third beamformer. Notably, beamformers may be implemented in hardware or software. For example, one or more beamformers may be implemented in one or more field programmable gate arrays ("FPGA").

In the processor block 178, each of N=3 processors are for processing respective beamformer outputs. Here, a first plurality of beams generated by the first beamformer is processed in a first processor, a second plurality of beams generated by the second beamformer is processed in a second processor, and a third plurality of beams generated by the third beamformer is processed in a third processor.

Processor outputs interconnect with a management section 192. Notably, one or more processors may be implemented in a single device such as a single processor or digital signal processor ("DSP") or in multiple devices such as multiple signal processors or digital signal processors.

Complementary data may be provided via, inter alia, a sensor interface section 190 that is interfaced with a plurality of sensors ES1, ES2, ES3. The sensor interface module may provide sensor data to the management section 192 and/or to processors in the processor block 178.

The management section 192 includes a sonar interface 194 and/or a workstation computer 196. In various embodiments control signals from the management block 192 are used for one or more of making power amplifier block 152 settings (e.g., for array shading), controlling transmit beamformers 156 and receive beamformers 176, selecting software pipeline block 174 operating frequencies, setting set signal generator block 158 operating frequencies, and providing processor block 178 operating instructions.

Applicant notes that the echo sounder systems of FIGS. 1C-F may be used to process hydrophone returns from targets i) present within an ensonified volume of the water body, ii) upon an ensonified surface of the bottom, or lying within an ensonified volume of the bottom.

In various embodiments, the MBES of FIGS. 1E-F distinguishes among signals based on frequency or frequency band. In various embodiments, the MBES of FIGS. 1E-F does not distinguish among signals using matched filtering.

Referring again to FIG. 1E.

Figure 1G:
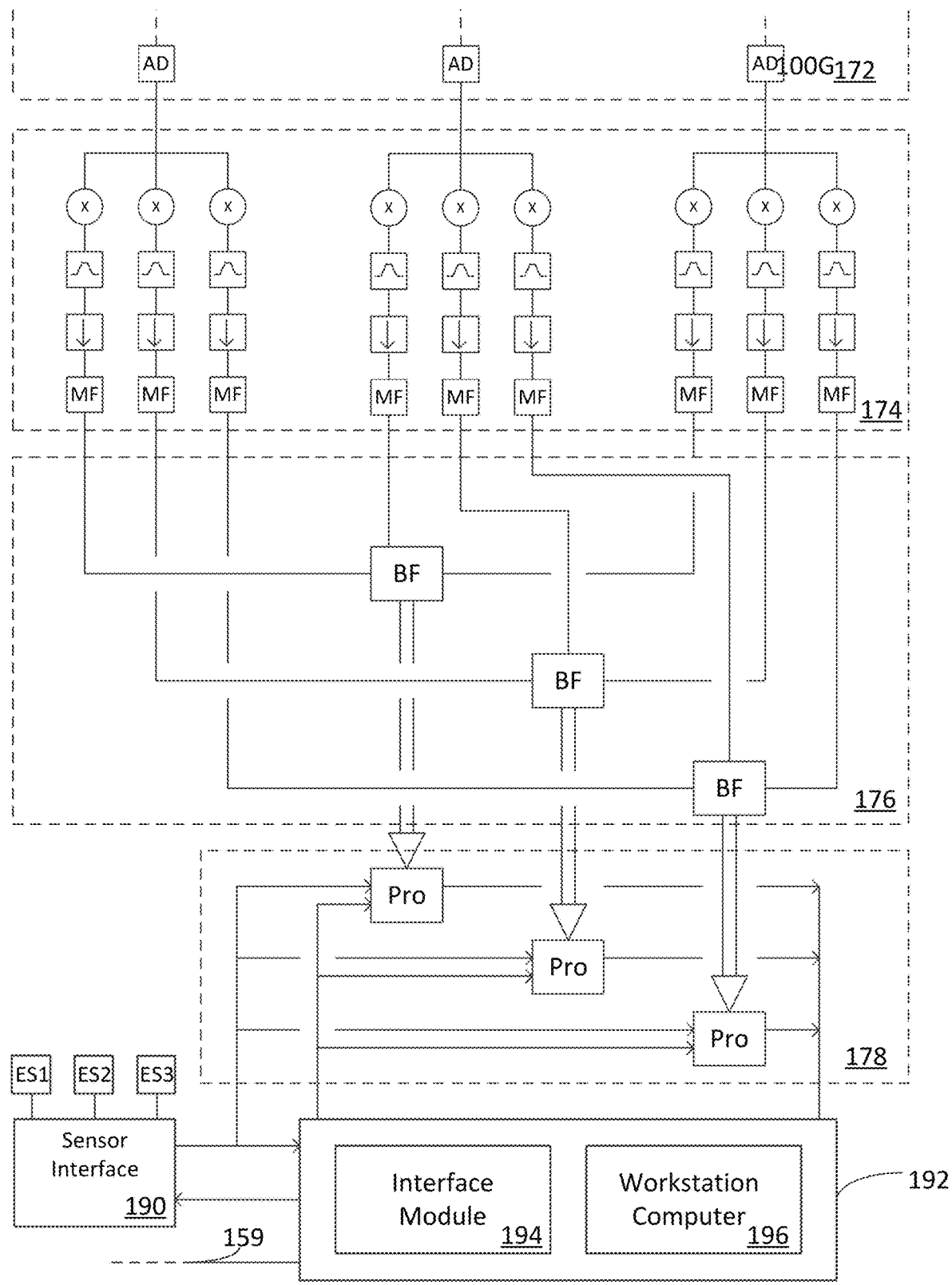

FIG. 1E and FIG. 1G show portions of an exemplary multibeam echo sounder system ("MBES") 100E-F. See FIG. 1H for nomenclature. The echo sounder system includes a transducer section 120, a transmitter section 150, and a receiver section 170. Some embodiments include an interface section 190 and/or a management section 192.

In the embodiment shown, a message 153 incorporating first, second, and third message components such as coded signals Scd1, Scd2, Scd3 where N=3 is used to excite three projectors in a projector array, and a receiver having three hardware pipelines and nine software pipelines is used to process three hydrophone signals T=3 to recover echo information specific to each of the N message components.

The transmitter section 150 is for exciting the projector array 130. The section includes a signal generator block 158, a transmit beamformer block 156, a summation block 154, and a power amplifier block 152.

In the signal generator block 158, signals are constructed, generated, recalled and/or otherwise provided. Here, an exemplary process is depicted with e.g., N=3 signal generators. In respective beamformers of the beamformer block 156, multiple beams are generated from each signal. In a summation block 154, the beams are combined to produce a summation block output signal or transmit message 153.

The transducer block 120 includes a projector array 130 and a hydrophone array 140 arranged, for example, as a Mills Cross. As shown, there are three projectors 131 in the projector array and three hydrophones 141 in the hydrophone array. In the power amplifier block 152, the summed signal or transmit message 153 is an input to power amplifiers driving respective projectors.

Applicant notes that for convenience of illustration, the projector and hydrophone counts are limited to three. As skilled artisans will appreciate, transducer arrays do not require equal numbers of projectors and hydrophones nor do the quantities of either of these types of transducers need to be limited to three. For example, a modern multibeam echo sounder might utilize 1 to 96 or more projectors and 64 to 256 or more hydrophones.

The array of T=3 hydrophones 141 is for receiving echoes resulting from the acoustic/pressure waves originating from the projector array 130. The resulting hydrophone signals are processed in the receiver section 170 which includes a hardware pipeline block 172, a software pipeline block 174, a receive beamformer block 176, and a processor block 178.

In the hardware pipelines block 172, each of T=3 hardware pipelines processes a respective hydrophone 141 signal through analog components including an analog-to-digital converter. In the embodiment shown, a hardware pipeline provides sequential signal processing through a first amplifier, an anti-aliasing filter such as a low pass anti-aliasing filter, a second amplifier, and an analog-to-digital converter.

In the software pipelines block 174, each of the T=3 hardware pipeline outputs is processed through N=3 software pipelines with downconversion and matched filtering. In the embodiment shown, a software pipeline provides sequential signal processing through a mixer (an oscillator such as local oscillator may be coupled to the mixer), a bandpass filter, a decimator, and a matched filter. Communications may occur via communications links between any of the processor block 178, the signal generator block 158, the hardware pipelines block 172, the software pipelines block 174, the and the beamformer block 176. See for example FIGS. 1C-D.

Each software pipeline may have a single mixer and/or each hardware pipeline may have no mixer. A processor 178 may control gain of a first and/or a second hardware pipeline amplifier. A processor may provide for tuning, for example via a processor controlled oscillator coupled with a mixer.

In the receive beamformer block 176, each of N=3 beamformers processes signals. As such, i) a first set of three software pipeline outputs corresponding to a first coded signal are processed by a first beamformer, ii) a second set of three software pipeline outputs corresponding to a second coded signal are processed by a second beamformer, and (iii) a third set of three software pipeline outputs corresponding to a third coded signal are processed by a third beamformer. Notably, beamformers may be implemented in hardware or software. For example, one or more beamformers may be implemented in one or more field programmable gate arrays ("FPGA").

In the processor block 178, each of N=3 processors are for processing respective beamformer outputs. Here, a first plurality of beams generated by the first beamformer is processed in a first processor, a second plurality of beams generated by the second beamformer is processed in a second beamformer, and a third plurality of beams generated by the third beamformer is processed in a third beamformer.

Processor outputs interconnect with a management section 192. Notably, one or more processors may be implemented in a single device such as a single processor or digital signal processor ("DSP") or in multiple devices such as multiple signal processors or digital signal processors.

Complementary data may be provided via, inter alia, a sensor interface section 190 that is interfaced with a plurality of sensors ES1, ES2, ES3. The sensor interface module may provide sensor data to the management section 192 and/or to processors in the processor block 178.

The management section 192 includes a sonar interface 194 and/or a workstation computer 196. In various embodiments control signals from the management block 192 are used for one or more of making power amplifier block 152 settings (e.g., for array shading), controlling transmit 156 and receive 176 beamformers, selecting software pipeline block 174 operating frequencies, setting set signal generator block 158 operating frequencies, and providing processor block 178 operating instructions.

Figure 2:
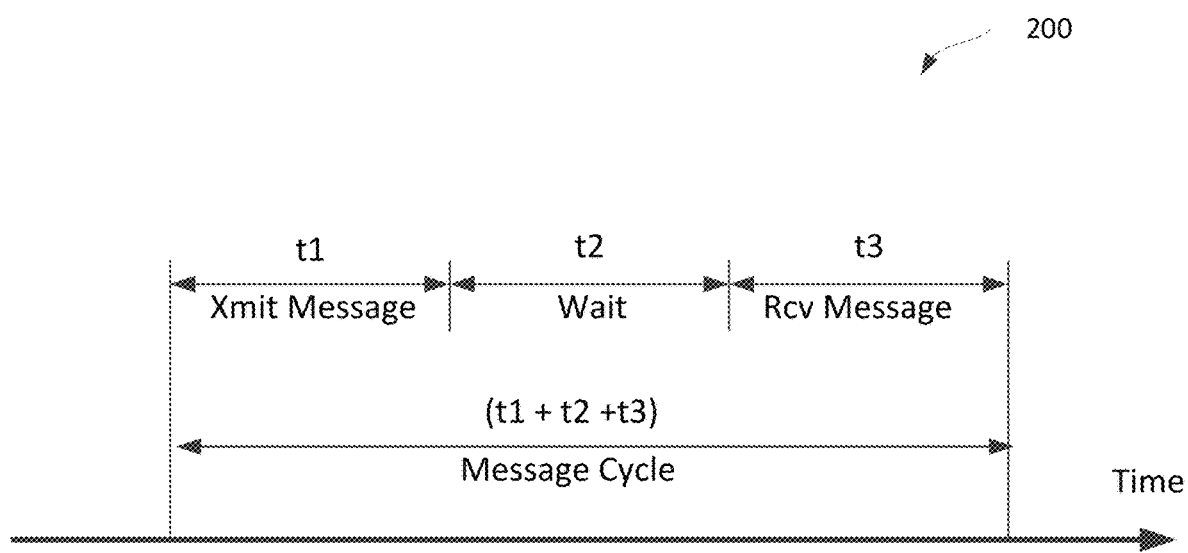
FIG. 2 shows a message cycle used by the survey system of FIG. 1A.

FIG. 2 shows a message cycle 200. The cycle includes a sequence of operations with transmission of a message during a time t1 and reception of a message during a time t3. Transmission of a message refers to the process that excites the projector array 130 and reception of a message refers to the complementary process that interprets the message echo received by the hydrophone array 140. A wait time t2 that varies primarily with range, angle, and sound speed may be interposed between the end of the message transmission and the beginning of the message reception. This wait time may be determined by round trip travel time for the longest sounding range, for example a return from the most distant cell in a swath ensonified by the projector array. In some embodiments, the transmit message length is in a range of 10 to 60 microseconds. In some embodiments, the transmit message length is about 10 milliseconds.

Sonar Data Compression

We turn now to embodiments that illustrate sonar data compression. These embodiments include ensonification of a fan with an appropriate message and selecting the strongest returns for viewing and use.

Figure 3A:
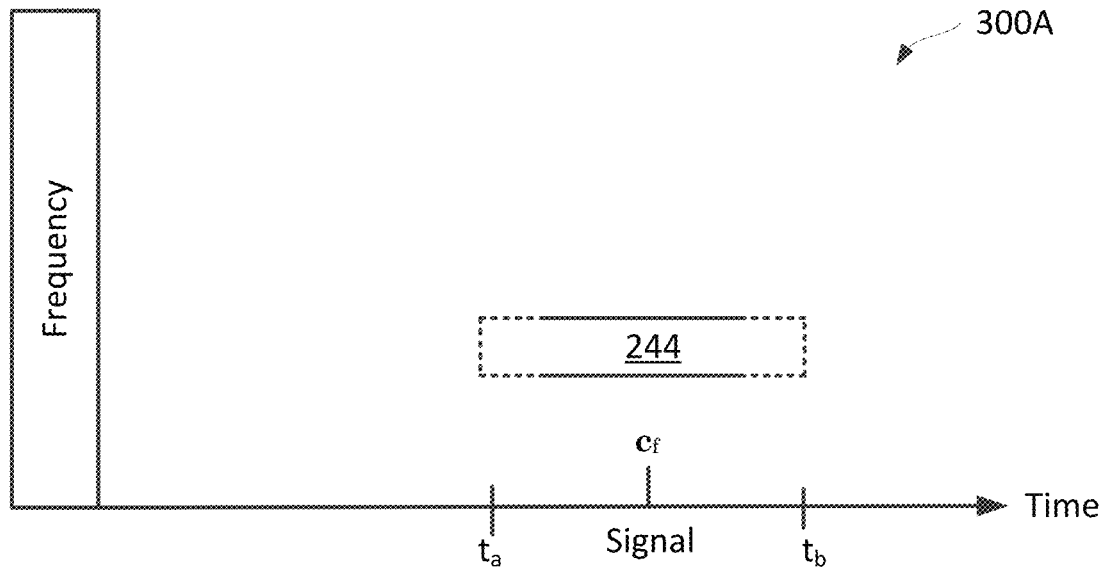
FIGS. 3A-C show ensonification of a fan using the survey system of FIG. 1A.

FIG. 3A shows a message 300A with a frequency centered signal sent between $t_a$ and $t_b$. The message may be a signal of many types: continuous wave (CW), frequency modulated (FM), orthogonal spread spectrum (OSS), phase-coded (PC), pulse train (PT), or low probability of intercept (LPI). In response to the message sent, data are returned and beamformed Each of the beamformed data points returned is represented by both a magnitude and a phase, and each beam is associated with a different steering angle, or beam angle, relative to the array face. Notably, the receive window duration (t) may be equal to or greater than the round-trip travel time of an echo of the farthest expected return, for example the farthest expected return reflected from the sea floor.

Figure 3B:
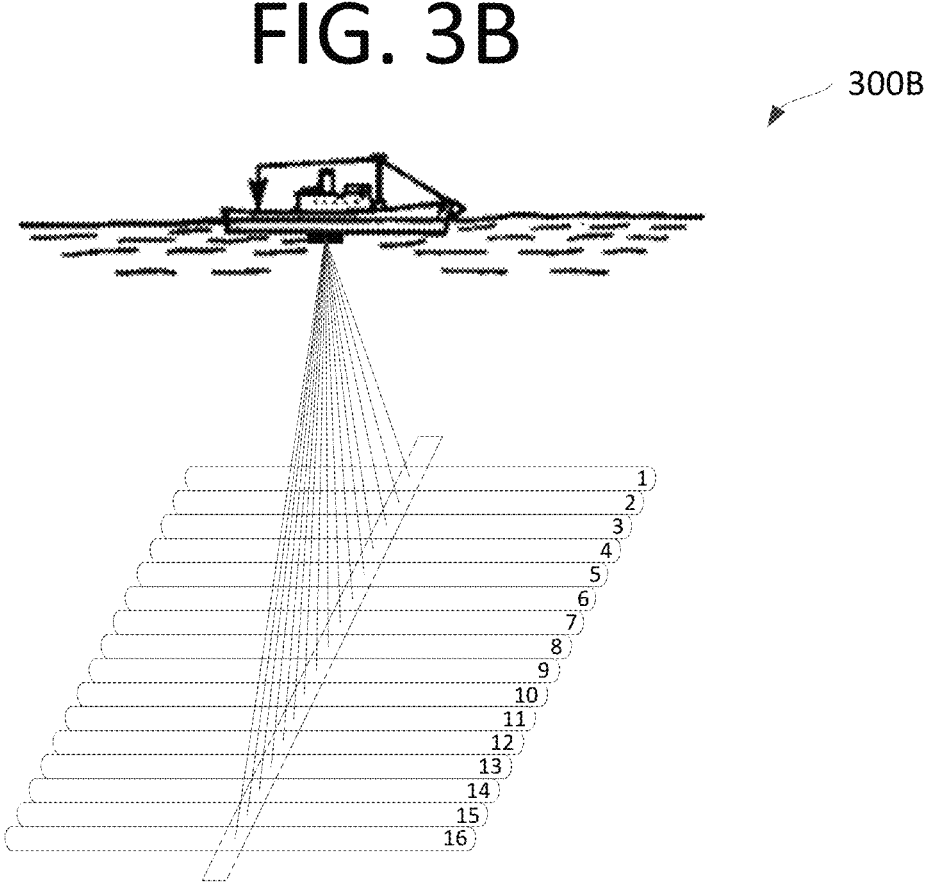

FIG. 3B shows a perspective view 300B of the beams formed by the hydrophone array 140 when receiving echoes.

To illustrate the methodology a multibeam echo sounder utilizing 16 beams, with 16 different beam angles, is chosen. Notably, the beams may reflect from the sea floor or be gated with range bins for water column assessment.

Figure 3C:
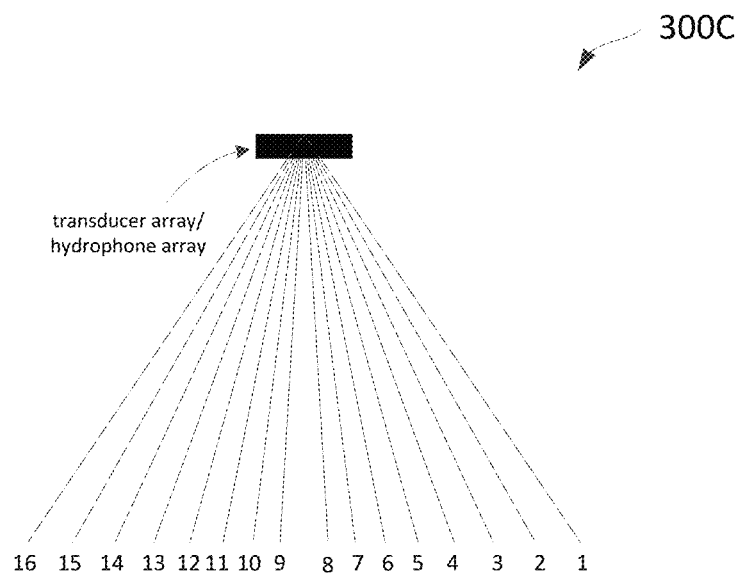

FIG. 3C shows a view of the beams 300C formed by the hydrophone array when viewed from the front of the boat and along the longitudinal axis of the boat. As seen, eight beams to either side of nadir are formed and data may be collected in accordance with number of $$\text{Data Points} = Q * t * fs$$

where Q is the number of beams, t is the receive window duration in seconds, fs is the receiver sampling rate in Hz, and each data point is represented by two values: a magnitude and phase. Note that the number of samples collected 's' from each beam is (t*fs).

Figure 3D:
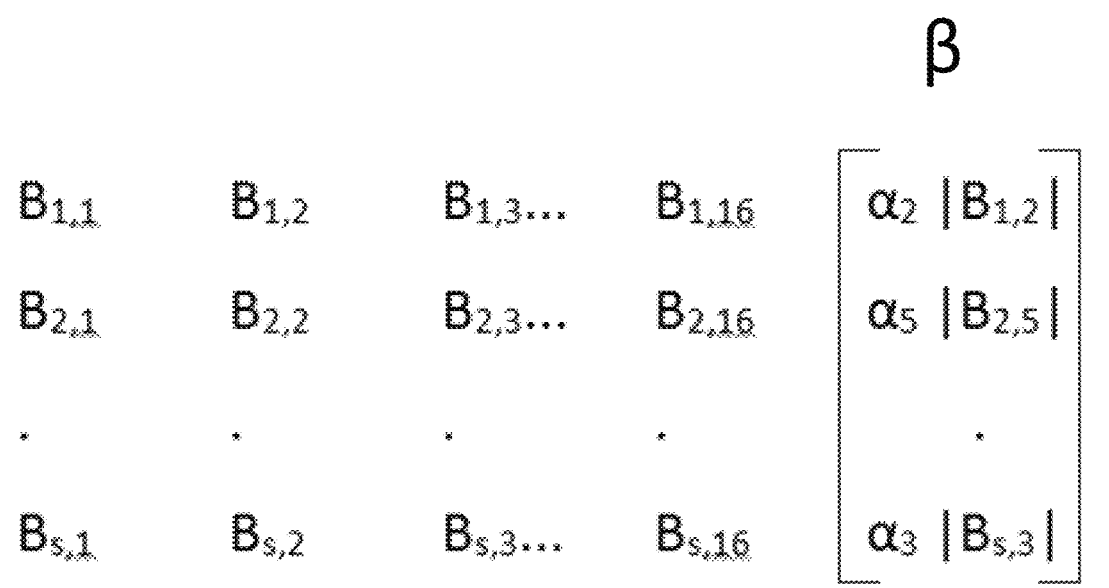

FIG. 3D shows a matrix of the data points 300D collected during the time span "t". Each entry $B_{x,y}$ in the matrix is a complex quantity providing a magnitude and phase for the $x^{th}$ sample and the $y^{th}$ beam. As shown, there are "s" samples collected in time span "t". (Note: Samples and data points may be different. For example samples are time/range tics set according to the sample rate of the receiver. For example data points are the output of the beamformers at a given sample.)

In the compression method, the magnitudes of beam data for all beams at a given sample (row of matrix 300D) are compared, and the beam angles α and magnitudes (|B|) associated with N greatest magnitudes are selected to populate a matrix ß for that sample. This matrix ß, with columns of beam angles and magnitudes, or data derived therefrom may be presented to the user as a compressed presentation or view of the data with a compression ratio of N:Q.

Note that when finding the beam with the greatest magnitude for a given sample, one can simply sort on magnitude. Other techniques include finding the peak of a moving averaging window and calculating an energy center of mass.

FIG. 3E shows a matrix of the data points 300E collected during the time span "t". As before, each entry $B_{x,y}$ in the matrix is a complex quantity providing a magnitude and phase for the $x^{th}$ sample and the $y^{th}$ beam. And, as shown there are "s" samples collected in time span "t".

However, here beams with the largest two magnitudes are selected (N=2) for each sample (row of the matrix 300E) such that a matrix ßß results with 2N columns and s rows. This matrix ßß or data derived therefrom may be presented to the user as a compressed presentation or view of the data with a compression ratio of N:Q.

How many magnitudes are selected from each row of the matrix depends on the user. It is normally the case that the number N selected is much less than the number of beams Q.

In FIG. 3C, all of the available beams are used. In other embodiments, less than all of the available beams may be used.

Subsectors in Sonar Data Compression

Figures 4A, 4B:
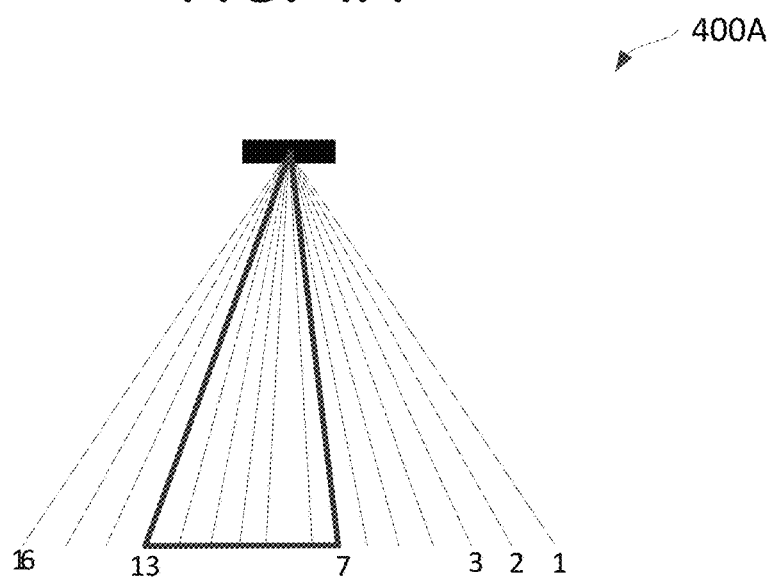
FIGS. 4A-I show sonar data compression after ensonification of one or more partial sectors using the survey system of FIG. 1A.

FIG. 4A shows a compressed view that is focused on a subsector. The subsector encompasses beams 7 through 13. In this example, one beam angle (N=1) will be reported for each sample. In this example, only data from beams 7 through 13 will be considered when finding the maximum magnitude as beams 7 and 13 are the limits of the defined subsector.

As shown in FIG. 4B, beam data with magnitudes and phases are indicated by vectors $B_{1,7} \ldots B_{s,13}$. Note that no beam indices extend beyond the limits at beams 7 and 13. Further, a matrix ß indicates for each sample the beam angle α that has the largest magnitude |B|. As mentioned earlier, N may be set to a value greater than 1 such the largest magnitude and also progressively smaller magnitudes are selected for each sample.

This type of compression may be useful where there is a feature present in other beams that is to be avoided. This type of compression may be useful where there is a feature present in beams 7 through 13 upon which to focus.

In FIG. 3C, all of the available beams are in a single sector. In other embodiments, the beams may be divided among multiple sectors, for example two sectors. The number of subsectors into which the whole sector is divided is represented by S.

Figures 4C, 4D:
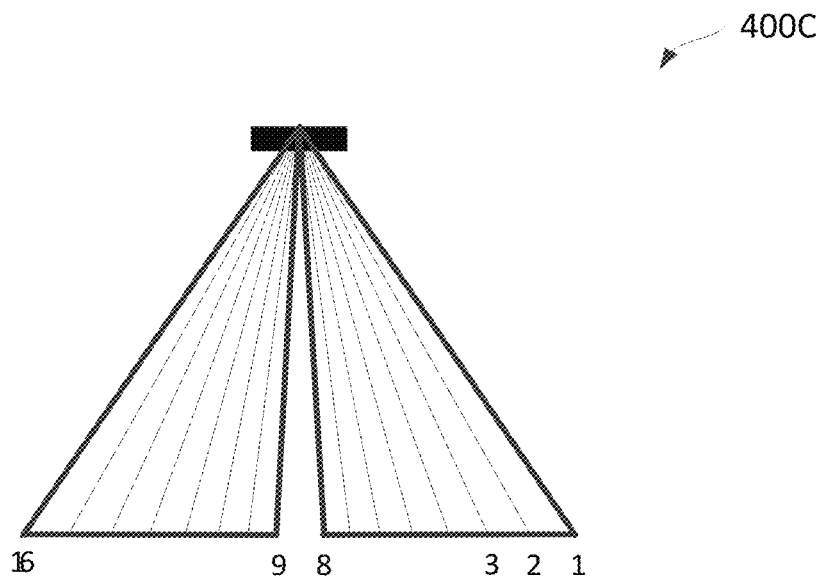

FIG. 4C shows a compressed view that is divided into two sub-sectors. Data from the first subsector shown in FIG. 4D encompass port beams 1-8 and data from the second subsector shown in FIG. 4E encompass starboard beams 9-16. In this example S*N beam angles and magnitudes, where S=2 and N=1, will be reported for each sample for a data compression ratio S*N:Q.

Figures 4E, 4F:
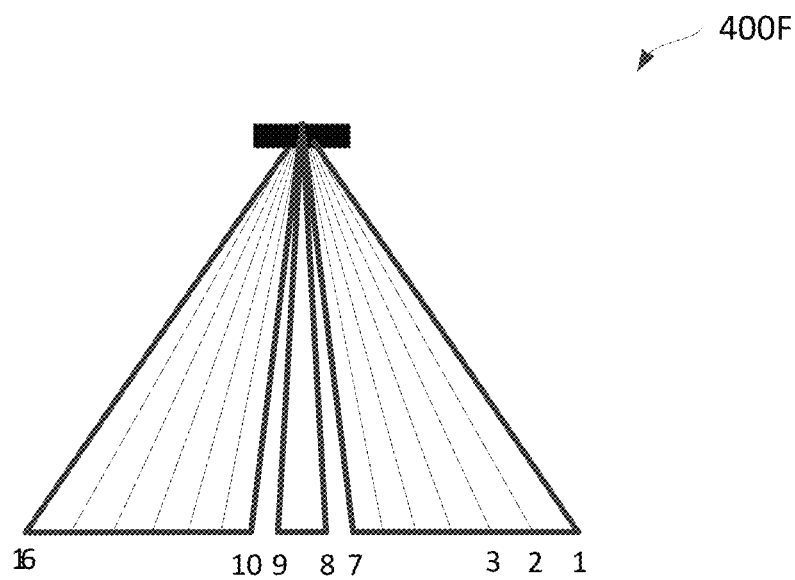

In FIG. 4D, there is a matrix of values ßp which represents the largest magnitude return at each sample value when only the port beams are considered. In FIG. 4E, there is a matrix of values ßr which represents the largest magnitude return at each sample value when only the starboard beams are considered. As mentioned earlier, N may be set to a value greater than 1 such the largest magnitude and also progressively smaller magnitudes are selected for each sample.

This type of compression may be useful where the returns from one side (eg. p) are much stronger than the returns from the other side (eg. r) insofar as the subsectors assure a view that has content from both sides.

In FIG. 3C, all of the available beams are in a single sector. In other embodiments, the beams may be divided among multiple sectors, for example three sectors.

Figure 4G:
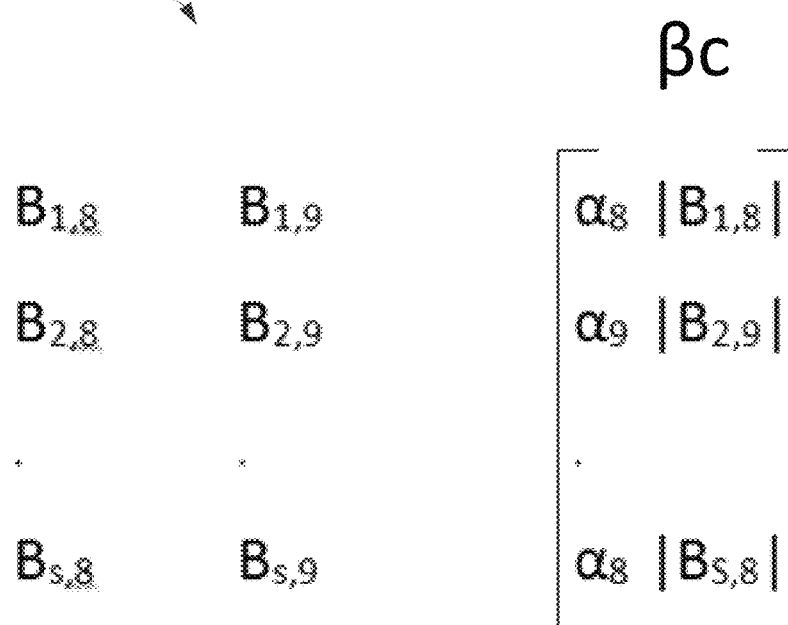
Figure 4H:
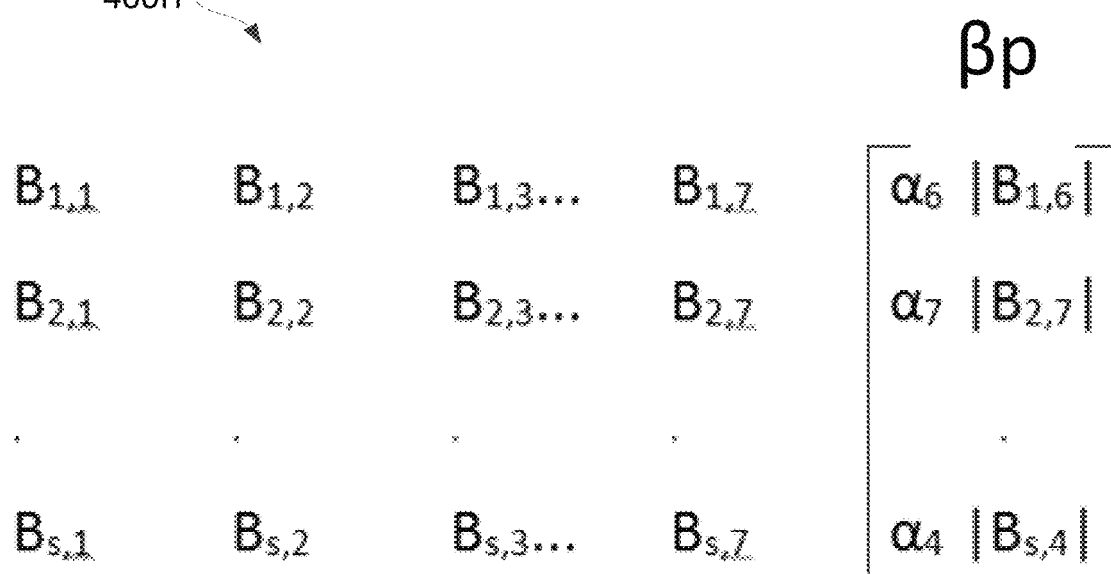
Figure 4I:
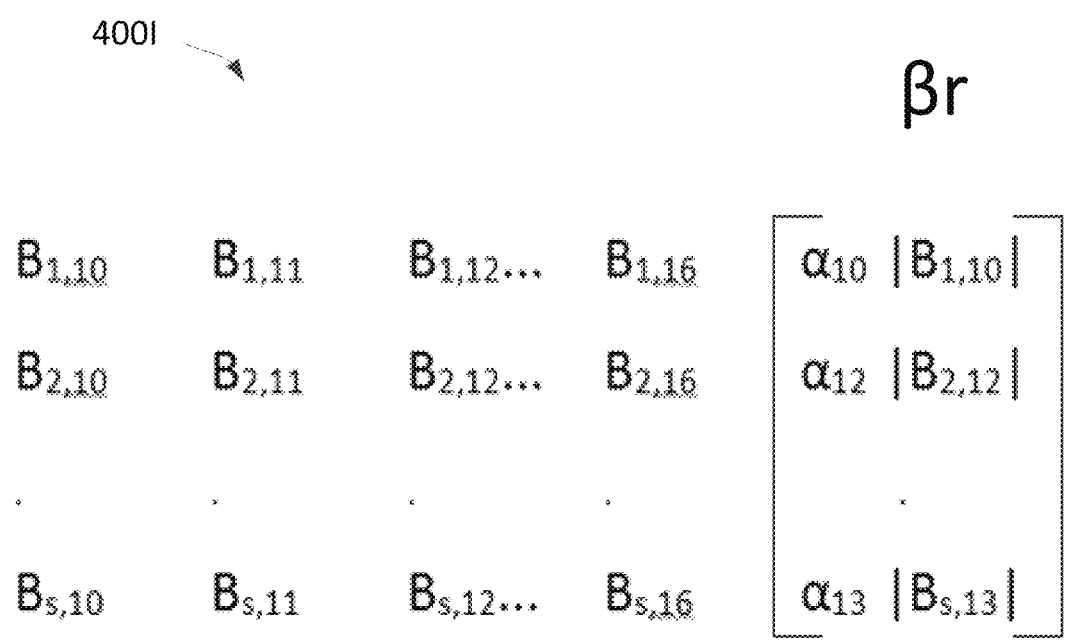

FIG. 4F shows a compressed view that is divided into three sub-sectors (S=3). As shown in FIG. 4G, the first subsector includes data from two beams, 8 and 9. As shown in FIG. 4H, the second subsector includes beams that are to port of the nadir beam, beams 1-7. As shown in FIG. 4I, the third subsector includes beams that are to starboard of the nadir beam, beams 10-16. In this example there are S*N beam angles where S=3 and N=1 will be reported for each sample for a data compression ratio S*N:Q.

In FIG. 4G, there is a matrix ßc of values α and |B| which represents the beam angle and magnitude of the largest magnitude return at each sample value when the central beams are considered. In FIG. 4H, there is a matrix ßp of values α and |B| which represents the largest magnitude return at each sample value when the port beams are considered. In FIG. 4I, there is a matrix ßr of values α and |B| which represents the largest magnitude return at each sample value when the starboard beams are considered. As mentioned earlier, N may be set to a value greater than 1 such the largest magnitude and also progressively smaller magnitudes are selected for each sample.

This type of compression may be useful where there is a central feature to be followed and there is a need to provide a context for the central feature. For example, the central feature might be a pipeline followed by the central beams and the context might be the zones to either side of the pipeline followed by the port and starboard beams.

As mentioned above, returns may be range gated. The returns may be range gated to focus on the sea floor or the returns may be range gated to focus on some portion of the water column.

Water Column Sonar Data Compression

Figure 5A:
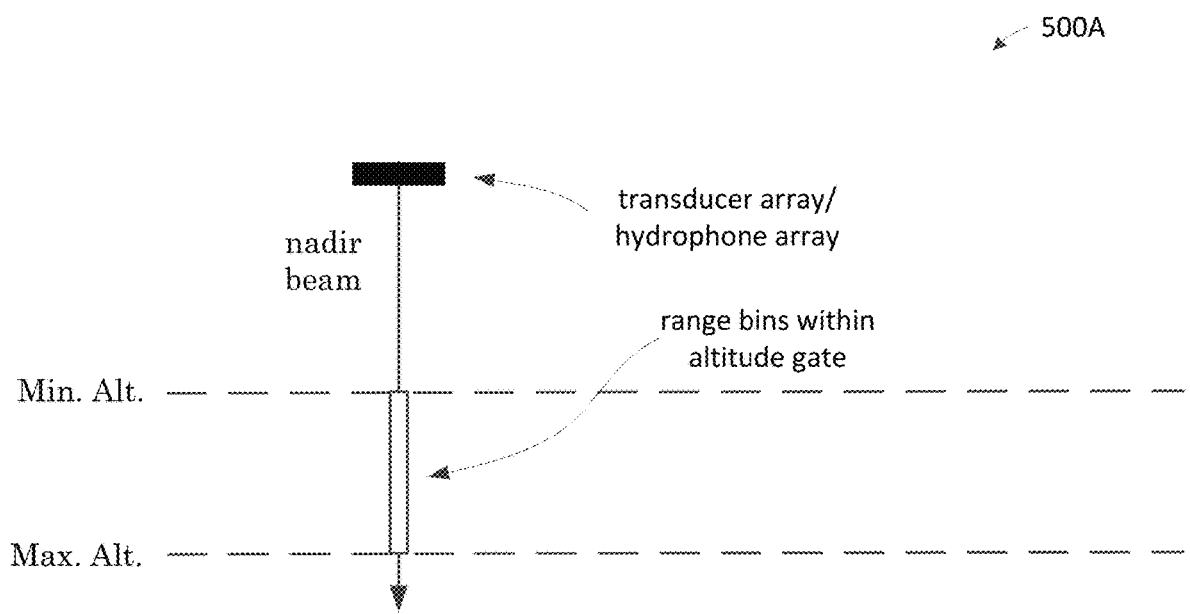
FIGS. 5A-C show sonar data compression focused on the waterbody bottom and water column using the system of FIG. 1A.

FIG. 5A shows a nadir beam emanating from the face of a transducer array 500A. If the beam is range gated at a maximum and minimum altitude, only those samples representing reflections that occurred within the altitude limits will be considered for data compression. Using the techniques described above, the strongest reflections from only a portion of the water column are reported when range gates are applied.

Figure 5B:
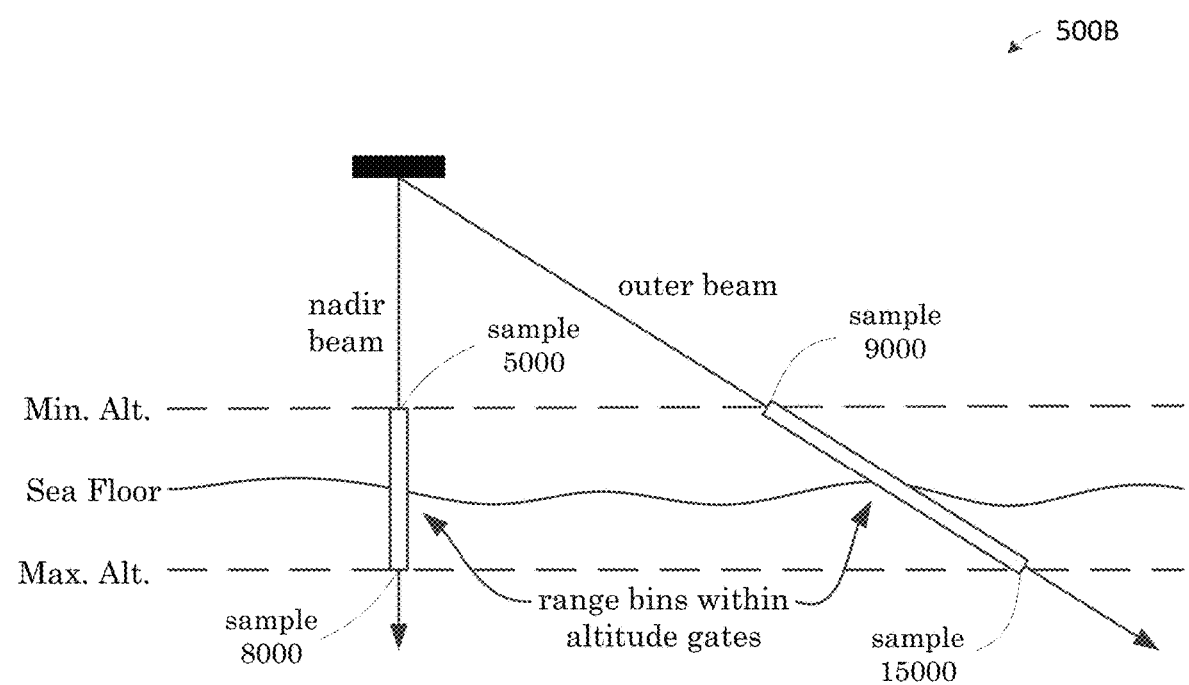

FIG. 5B shows a nadir beam and an outer beam emanating from an array face 500B. In this example the range gates are set to capture the sea floor with a minimum altitude above the expected floor elevation and a maximum altitude below the expected floor elevation.

In an exemplary scan of the sea floor, the nadir beam is range gated between sample 5000 and 8000. In similar fashion, the outer beam is gated in the range gated between sample 9000 and 15000. That is to say that the reflections of interest occur in the range of samples 5000 to 8000 in the nadir beam and somewhat later in time, between samples 9000 and 15000, in the outer beam.

Figure 5C:
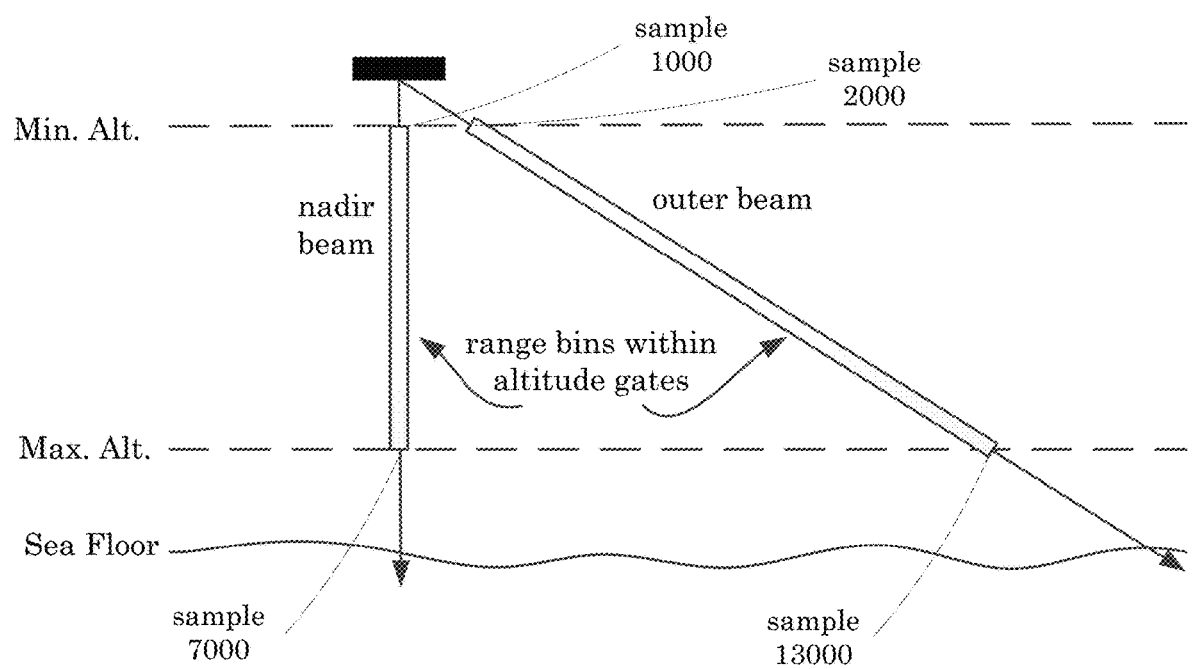

FIG. 5C shows a nadir beam and an outer beam emanating from an array face 500C. In this example the range gates are set to capture a portion of the water column with a maximum altitude above the sea floor elevation and a minimum altitude above the sea floor elevation.

In an exemplary scan of the sea floor, the nadir beam is range gated between sample 1000 and 7000. In similar fashion, the outer beam is gated in the range gated between sample 2000 and 13000. That is to say that the reflections of interest occur in the range of samples 1000 to 7000 in the nadir beam and somewhat later in time, between samples 2000 and 13000, in the outer beam.

The techniques described above can be applied jointly, allowing for a gating in altitude within multiple sub-sectors. In various cases, the reporting of magnitude and beam angle associated with peak beam indices results in a significant data compression.

Beam Angle Precision

As described above, the reported beam angles are the nominal beam angles assigned to each beam by the beamformer. As such, these beam angles may be viewed as crude estimates of actual angle.

Angle measurement to the points of backscatter resulting in the N peak magnitudes may be improved. For example, a split array phase difference technique may be used to better estimate these angles. See e.g. Denbigh, P. (1989), "Swath Bathymetry: Principles of operation and an Analysis of Errors," IEEE J. of Oceanic Eng. 14(4), 289-298.

The technique begins by practically dividing the receive array in half and treating it as two subarrays with half the total elements each. A beamformer is applied to the elements of each half, steering a beam in the direction of the N beam angles α identified earlier for each of the s samples.

This will result in two complex numbers representing each half of the array for each sample index and beam angle. The phase difference between each pair of complex values is measured as ΔΦ and is used to calculate the angle Φ of the echo arrival relative to the array axis via the known relationship:

$$\Delta\Phi = 2\pi * a/\lambda * \sin(\Phi)$$

where λ is the acoustic wavelength at the given center frequency fc and speed of sound at the sonar c, and a is the distance between the phase centers of the two sub arrays.

The fine angle measurement is repeated N times for all s samples. And, in a final report, N*s peak magnitudes and corresponding angles are returned to the user.

Because the sample rate "fs" is known, each sample index "nn" can be converted into a travel time "tt" and a range "r". The relationships are:

$tt = nn/fs$ and $r = tt * c/w$

The sonar data compression methods mentioned above provide water column and bathymetry swath data with high angular and range resolution using only a fraction of the data required by conventional imaging. In addition to data compression benefits, the algorithm inherently filters out relatively weak returns from inconsequential targets that might otherwise be distracting to an operator if visualized.

It also eliminates undesirable false returns often seen in all non-nadir beams at the range bin of the nadir beam altitude caused when the strong nadir return is amplified by a sidelobe of a non-nadir beam. Because these false returns all share the same range/time sample, the maximum over all beams at that sample will naturally be at the nadir beam; the algorithm will select the true maximum at nadir and ignore all others.

In all cases above, the backscatter response results from ensonification at a single center frequency fc. This response can be enhanced.

Multispectral Sonar Data Compression

Reflectors and scattering centers of different sizes and roughnesses may have varying echo responses dependent upon the center frequency of the sound which impinges on them. This characteristic may be exploited in bottom classification missions using multispectral ensonification. For example, where a sea floor is ensonified with multiple frequencies and the echoes are compared in order to segment and/or classify the bottom surface.

This characteristic may also be exploited where the water column is concerned. For example, where scatterers in the water column are ensonified with multiple frequencies and the echoes are compared in order to classify material in the water column.

The sonar data compression methods above may be enhanced where signals with multiple center frequencies, for example multiple widely spaced center frequencies, are used to ensonify reflectors and scattering centers. Per the description of the MBES above, each of n different signals will have its own software pipeline and beamformer. The compression algorithm is then applied to each of the n beamformer outputs individually, resulting in n pairs of beam angle α and magnitude |B| values saved for each of s samples.

During multifrequency operations, it can be advantageous to compare returns at different frequencies received at the same time from the same scatterers. However, the peak magnitude may not be at the same beam and same sample for all n center frequencies, so the compression algorithm as described above may not capture simultaneous frequency dependent information from the same scatterers at each sample. Therefore, in another embodiment, when the algorithm identifies the beam angle with the peak magnitude for a given sample and center frequency, it will also record the magnitude of beam data at the same beam angle and sample for all other (n−1) center frequencies/signals.

FIG. 6A shows multimission message content and message construction table for exemplary multimission surveys 600A. As seen in the table, a multimission survey is carried out using a multimission message which may be constructed in a particular manner.

A first multimission survey includes a first bathymetry mission and a second bathymetry mission. Typically, intermediate bands are not used.

The first bathymetry mission utilizes a relatively low frequency band with a CW or FM signal. The second bathymetry mission utilizes a relatively high frequency band with a CW or FM signal. These signals may be serialized or paralleled in a single ping message. These signals may be sent in respective pings as a multi-ping message. Having read applicant's disclosure, skilled artisans will recognize the advantages of this multimission survey which, among other things, resolves long standing problems associated with choosing one or the other of a high frequency (relatively high resolution/relatively short range) survey or a low frequency (low resolution/long range) survey. In an embodiment, the frequency bands are widely spaced with band gaps therebetween.

A second multimission survey includes a first waterbody bottom or seafloor characterization mission and a second waterbody bottom or seafloor characterization mission. Typically, intermediate bands may be used.

The first waterbody bottom mission utilizes a relatively low frequency band with a CW signal. The second waterbody bottom mission utilizes a relatively high frequency band with a CW signal. These signals may be paralleled in a single ping message. These signals may be sent in respective pings in a multi-ping message. Having read applicant's disclosure, skilled artisans will recognize the advantages of this multimission survey which, among other things, resolves long standing problems associated with obtaining survey data sufficient for use in segmenting and/or classifying a waterbody bottom surface and/or waterbody bottom subsurface where the echo response varies with sonar frequency. Notably beneficial to bottom segmentation and/or bottom classification survey missions are parallel signals in a single ping message that provide for echoes at multiple frequencies from the same backscatterers.

A third multimission survey includes a first waterbody bottom characterization or segmentation mission and a second bathymetry mission. Typically, intermediate bands may be used.

The first waterbody bottom characterization or segmentation mission utilizes a relatively lower frequency band with a CW signal or, in some embodiments, two or three CW signals. The second bathymetric mission utilizes a relatively higher frequency band with an FM signal. These signals may be serialized or paralleled in a single ping. These signals may be sent in respective pings in a multi-ping message. Having read applicant's disclosure, skilled artisans will recognize the advantages of this multimission survey which, among other things, resolves long standing problems associated obtaining survey data useful for both characterization or segmentation of the waterbody bottom and bathymetry in a single pass.

A fourth multimission survey includes a first Doppler navigation mission and a second multi-fan bathymetric mission. Typically, no intermediate bands are used. Multi-fan may refer to plural quasi-parallel fans or swaths including a first fan and one or more additional fans steered fore and/or aft of the first fan. For example, a multi-fan mission might use a central athwartship fan and quasi-parallel fans to either side of the athwartship fan.

The first Doppler navigation mission utilizes a relatively lower frequency band with a phase coded signal such as a Barker code. The second multi-fan bathymetric mission utilizes a relatively high frequency band with a spread spectrum signal such as orthogonal coded pulses (OCP).

These signals may be serialized in a single ping. Because OCP signals are distinguished by their code pattern, multiple ones of these coded signals may be used to ensonify respective parallel or somewhat parallel swaths in a fan-like arrangement. The returns from the OCP signals are distinguished using the code patterns. These signals may be serialized in a single ping or sent in respective pings in a multi-ping message. Having read applicant's disclosure, skilled artisans will recognize the advantages of this multimission survey which, among other things, resolves long standing problems associated with along track sounding density, multi-aspect multibeam surveys, and concurrent bathymetric and navigation operations.

A fifth multimission survey includes a first sub-bottom profiling mission and a second bathymetry mission. Typically, intermediate bands may be used.

The first waterbody bottom mission utilizes a relatively low frequency band with a CW signal. The second waterbody bottom mission utilizes a relatively high frequency band with a CW signal. These signals may be paralleled in a single ping message. These signals may be sent in respective pings in a multi-ping message. Having read applicant's disclosure, skilled artisans will recognize the advantages of this multimission survey which, among other things, resolves long standing problems associated with obtaining survey data sufficient for use in sub-bottom profiling and bathymetry. Notably beneficial to sub-bottom profiling is parallel transmission of both the sub-bottom profiling signal(s) and the bathymetry signal(s) such that the signals are returned from the same backscatterers.

A sixth multimission survey includes a first water column characterization mission and a second water column characterization mission. Typically, intermediate bands may be used.

The first water column mission utilizes a relatively low frequency band with a CW or FM signal. The second water column mission utilizes a relatively high frequency band with a CW or FM signal. These signals may be serialized or paralleled in a single ping message. These signals may be sent in respective pings in a multi-ping message. Having read applicant's disclosure, skilled artisans will recognize the advantages of this multimission survey which, among other things, resolves long standing problems associated with obtaining water column data sufficient for use in segmenting and/or classifying water column scatterers where the echo response varies with sonar frequency. Notably beneficial to water column segmentation and/or water column classification missions are parallel signals in a single ping message that provide for echoes at multiple frequencies from the same backscatterers.

A seventh multimission survey includes a first water column characterization or segmentation mission and a second bathymetry mission. Typically, intermediate bands may be used.

The first water column characterization or segmentation mission utilizes a relatively lower frequency band with a CW or FM signal or, in some embodiments, two or three CW or FM signals. The second bathymetric mission utilizes a relatively higher frequency band with an FM signal. These signals may be serialized or paralleled in a single ping. These signals may be sent in respective pings in a multi-ping message. Having read applicant's disclosure, skilled artisans will recognize the advantages of this multimission survey which, among other things, resolves long standing problems associated obtaining survey data useful for both characterization or segmentation of the water column and bathymetry in a single pass.

FIGS. 6B-H show exemplary messages with particular signal frequencies for use in multimission surveys 600B-H.

Figure 6B:
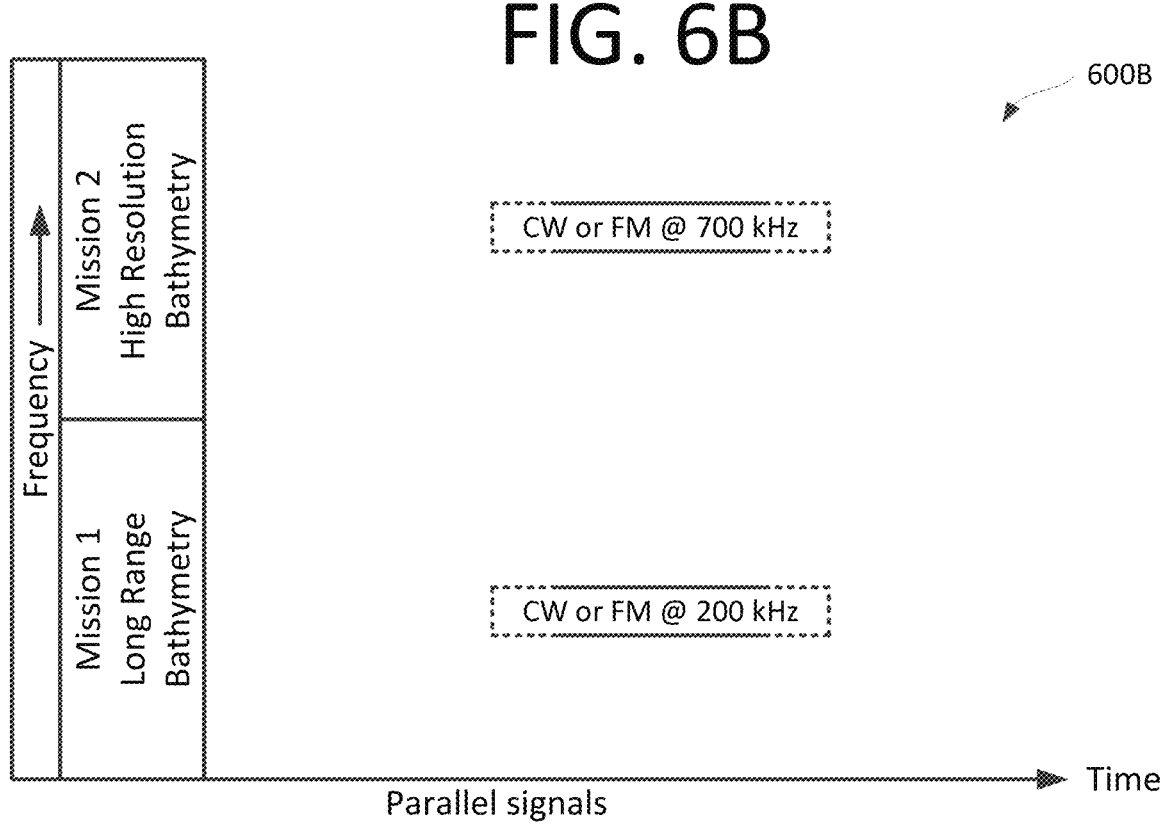

FIG. 6B shows a first multimission survey including a first long range bathymetry mission and a second high resolution bathymetry mission 600B.

The first long range bathymetry mission utilizes a relatively lower frequency band with a CW or FM signal having a center frequency of about 200 kHz and respective bandwidths of about 5 to 30 kHz and about 30 to 60 kHz.

The second high resolution bathymetry mission utilizes a relatively higher frequency band with a CW or FM signal having a center frequency of about 700 kHz and respective bandwidths of about 20 to 60 kHz and about 20 to 60 kHz. These signals may be paralleled (as shown) in a single ping message. These signals may be sent in respective pings in a multi-ping message.

Figure 6C:
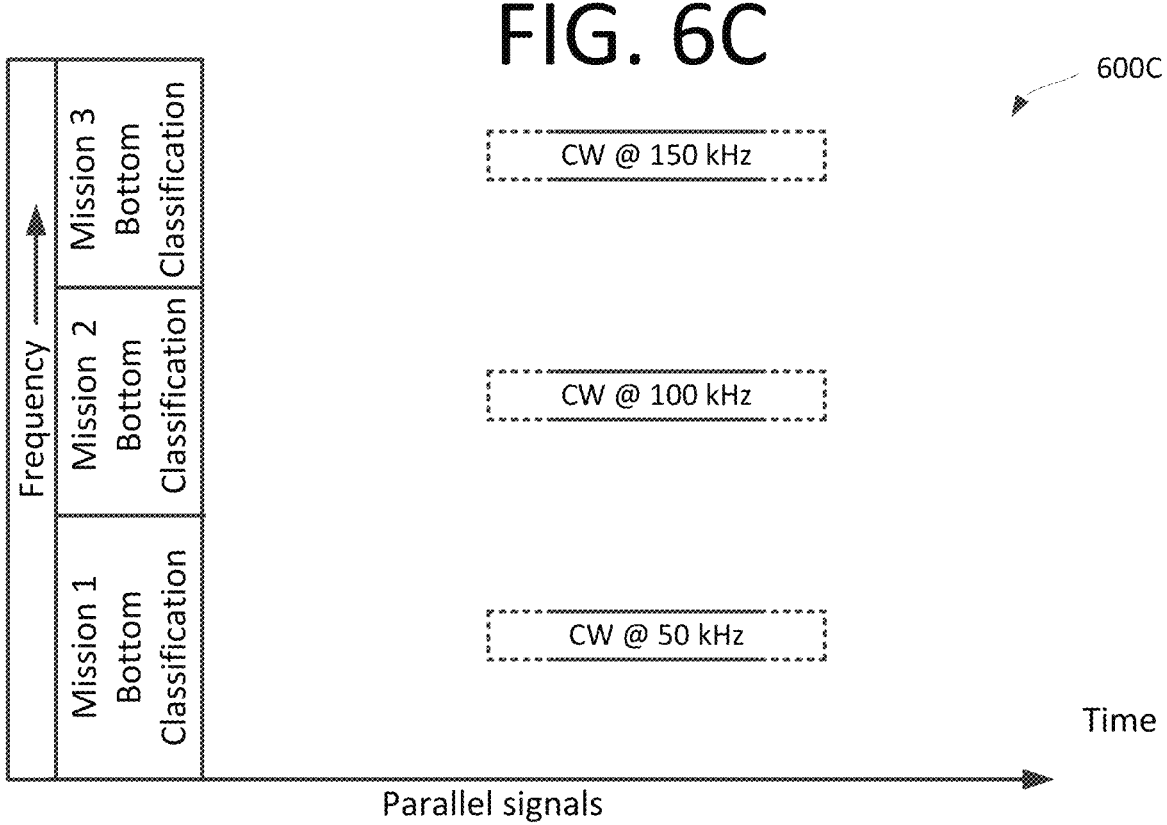

FIG. 6C shows a second multimission survey including three bottom characterization or segmentation missions 600C.

The first bottom characterization or segmentation mission utilizes a relatively low frequency band with a CW signal having a center frequency of about 50 kHz and a bandwidth of about 2 to 10 kHz.

The second bottom characterization or segmentation mission utilizes an intermediate frequency band with a CW signal having a center frequency of about 100 kHz and a bandwidth of about 2 to 10 kHz.

The third bottom characterization or segmentation mission utilizes a relatively higher frequency band with a CW signal having a center frequency of about 150 kHz and a bandwidth of about 2 to 10 kHz. These signals may be paralleled (as shown) in a single ping message. These signals may be sent in respective pings in a multi-ping message.

These center frequencies at 50, 100, 150 kHz may be shifted to avoid harmonics. For example, where the 50 kHz center frequency locates the center of a first frequency band, first harmonics may be avoided by shifting the 50 kHz center frequency by a frequency increment approximating the width of the first frequency band. For example, where the 150 kHz center frequency locates the center of a second frequency band, second harmonics may be avoided by shifting the 150 kHz center frequency by a frequency increment approximating the width of the second frequency band. As skilled artisans will understand, yet other similar changes to the above center frequencies may avoid harmonics.

FIG. 6D shows a third multimission survey including a first bottom characterization or segmentation mission and a second bathymetry mission 600D.

The first bottom characterization or segmentation mission utilizes a relatively low frequency band with three CW signals having respective center frequencies of about 50, 150, 250 kHz. As described above, these center frequencies may be shifted to avoid harmonics. And where, as here, plural signals in respective bands are used to fulfill a single mission, the mission may be referred to as a multiband mission.

The second bathymetric mission utilizes a relatively higher frequency band with an FM signal having a center frequency of about 400 kHz and a bandwidth of about 30 to 60 kHz. These signals may be serialized or paralleled (as shown) in a single ping message. These signals may be sent in respective pings in a multi-ping message. Notably, the phrase "about . . . kHz" refers to manufacturing and operating tolerances associated with generation, transmission, reception, and/or deconstruction of signals by modern day sonar equipment used for bathymetry and/or bottom segmentation.

FIG. 6E shows a fourth multimission survey including a first navigation mission and a second bathymetry mission 600E.

The first navigation mission utilizes a relatively lower frequency band with a phase coded signal having a center frequency of about 100 kHz and a bandwidth of about 60 kHz.

The second bathymetry mission utilizes a relatively higher frequency band with three OSS signals having a center frequency of 400 kHz. The OSS signals may have similar bandwidths and occupy a common band having a bandwidth of about 100 kHz. Where, as here, there are multiple OSS signals occupying a common band, this may be referred to as a multisignal band and the signals within this band may be referred to as a package of signals.

These signals may be sent in a message having a combination parallel and serial format with the bathymetry mission signals sent in parallel and the navigation signal sent before or after the bathymetry signals.

Figure 6F:
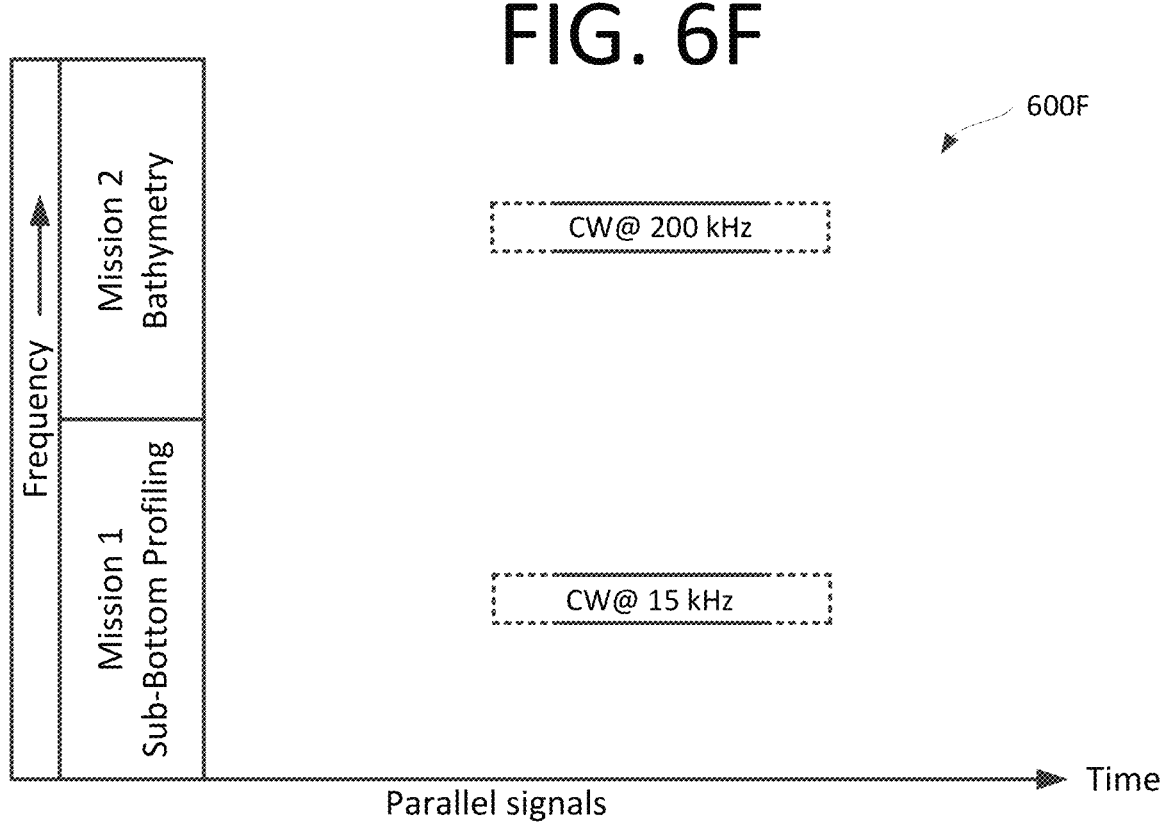

FIG. 6F shows a fifth multimission survey including a first sub-bottom profiling mission and a second bathymetry mission 600F.

The first sub-bottom profiling mission utilizes a relatively low frequency band with a CW signal having a center frequency of in a range of about 10 to 30 kHz, here 15 kHz, and a bandwidth of about 1 kHz.

The second bathymetry mission utilizes a relatively high frequency band with a CW signal having a center frequency of about 200 kHz and a bandwidth of about 20 to 60 kHz. These signals may be paralleled (as shown) in a single ping message. These signals may be sent in respective pings in a multi-ping message.

Figure 6G:
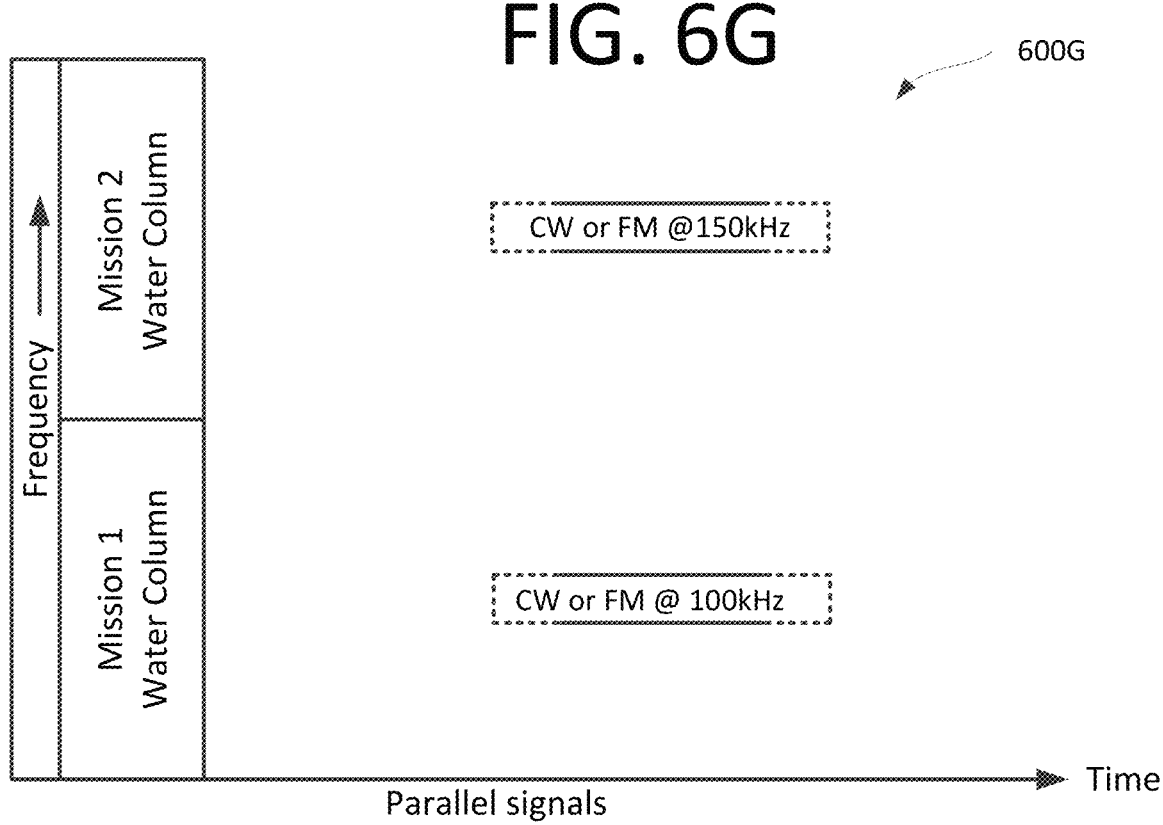

FIG. 6G shows a sixth multimission survey including a first water column mission and a second water column mission 600G.

The first water column mission utilizes a relatively low frequency band with a CW or FM signal having a center frequency of about 100 kHz and respective bandwidths of about 10 to 20 kHz and about 10 to 30 kHz.

The second water column mission utilizes a relatively higher frequency band with a CW or FM signal having a center frequency of about 150 kHz and respective bandwidths of about 10 to 20 kHz and about 10 to 30 kHz. These signals may be paralleled (as shown) in a single ping message. These signals may be sent in respective pings in a multi-ping message.

Figure 6H:
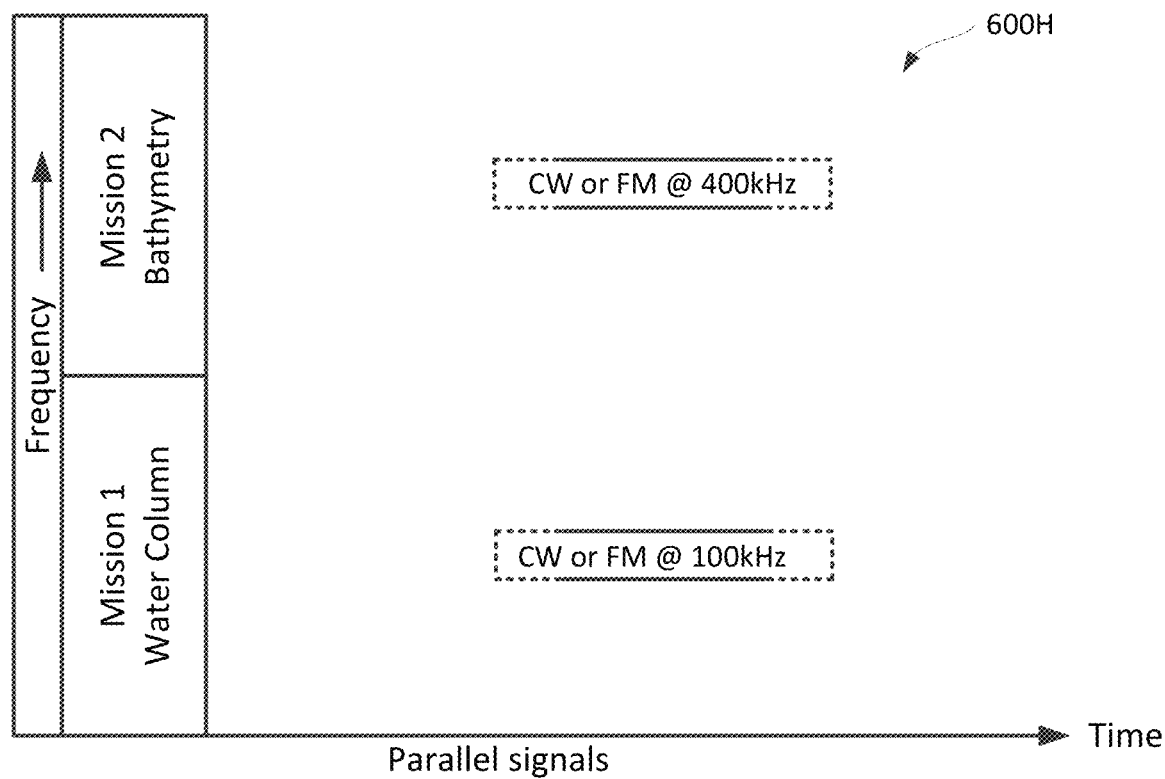

FIG. 6H shows a seventh multimission survey including a first water column mission and a second bathymetry mission 600H.

The first water column mission utilizes a relatively low frequency band with a CW or FM signal having a center frequency of about 100 kHz and respective bandwidths of about 10 to 30 kHz and about 30 to 60 kHz.

The second bathymetry mission utilizes a relatively higher frequency band with a CW or FM signal having a center frequency of about 400 kHz and respective bandwidths of about 20 to 60 kHz and about 30 to 60 kHz. These signals may be paralleled (as shown) in a single ping message. These signals may be sent in respective pings in a multi-ping message. Applicant notes the center frequencies of the signals mentioned in connection with FIGS. 6A-E are examples. In various embodiments, these center frequencies may vary in ranges of +/−5%, +/−10%, +/−25% and/or +/−50%. Applicant notes that the bandwidths of the signals mentioned in connection with FIGS. 6A-E are examples. In various embodiments, these bandwidths may vary in the ranges of +/−5%, +/−10%, +/−25% and/or +/−50%.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. A method of compressing data from a sonar system comprising the steps of:
    providing an acoustic transceiver including a transmitter and a receiver, the acoustic transceiver interconnected with plural transducers in a single projector array and plural transducers in a single hydrophone array;
    exciting the projector array with a transmitter message such that a particular geometric space is ensonified;
    receiving echoes via the plural hydrophones from the geometric space at each of plural times $t_1, t_2, \ldots t_z$;
    at each of one or more of the times $t_x$, forming Q receive beams with respective angles of arrival, the Q receive beams formed by the hydrophone array;
    associating each of the Q beams with a magnitude $M_{t_x,i}$ indexed by the time $t_x$ and beam number i; and,
    identifying as characterizing beams one or more beams with largest and next largest magnitudes at each of the times $t_x$;
    wherein compressed data results from using data associated with the characterizing beams as a compressed characterization of the ensonified space.

2. The method of claim 1 wherein the projector array and the hydrophone array are installed on a water-going vehicle.

3. The method of claim 1 wherein for each time $t_x$ a beam with a first largest magnitude $(M_{t_x,i})_{max1}$ is identified as the characterizing beam such that the data associated with these characterizing beams is the compressed characterization of the ensonified space.

4. The method of claim 1 wherein for each time $t_x$ the beams with first largest magnitude $(M_{t_x,i})_{max1}$ and second largest magnitude $(M_{t_x,i})_{max2}$ are identified as the characterizing beams such that the data associated with these characterizing beams is the compressed characterization of the ensonified space.

5. A method of compressing data from a sonar system comprising the steps of:
    providing an acoustic transceiver including a transmitter and a receiver, the acoustic transceiver interconnected with plural transducers in a single projector array and plural transducers in a single hydrophone array;
    exciting the projector array with a transmitter message such that a particular geometric space is ensonified;
    receiving echoes via the plural hydrophones from the geometric space at each of plural times $t_1, t_2, \ldots t_z$;
    at each of one or more of the times $t_x$, forming Q receive beams with respective angles of arrival, the Q receive beams formed by the hydrophone array;
    forming a first subsector from a subset $S_1$ of u<Q beams; and,
    associating each of the u beams with a magnitude $M_{t_x,i}$ indexed by the time $t_x$ and beam number i;
    wherein for each time $t_x$, the beams with the first, second . . . N<u largest magnitudes among the u beams $(M_{t_x,i})_{umax1, umax2 \ldots umaxN}$ are found and data associated with these characterizing beams are used as a compressed characterization of the ensonified space.

6. The method of claim 5 further comprising:
   forming T subsectors from respective subsets $S_1, S_2 \ldots S_T$ of the Q beams wherein for each time $t_x$ and for each of the T subsectors the subsector beams with the N largest magnitudes $[(M_{t_x,i})_{Tmax1, Tmax2 \ldots TmaxN}]_{Sx}$ are identified as characterizing beams and data associated with these characterizing beams are used as a compressed characterization of an ensonified space.

7. The method of claim 5 wherein the quantity Q may vary at each time $t_x$.

8. The method of claim 5 wherein echo samples at each time $t_x$ are range gated within minimum and maximum altitudes to generate gated echo samples.

9. The method of claim 5 wherein the single projector array is linear and the single hydrophone array is linear; and,
   configuring the projector array orthogonally with respect to the hydrophone array to form a Mills cross such that a projector array transmit beam and multiple hydrophone array receive beams intersect.

10. The method of claim 5 wherein the acoustic transceiver produces n projector signals;
    for each of the n projector signals, the Q beams are generated with a respective beamformer at each time $t_x$;
    for each of the times $t_x$ identifying as a characterizing beam a beam with the largest magnitude $(M_{t_x,i})_{maxn1}$ from among each of the n beamformers' Q beams; and,
    using data associated with the characterizing beams as a compressed characterization of the ensonified space.

11. A method of compressing data from a sonar system comprising the steps of:
    providing an acoustic transmitter and an acoustic receiver, plural transducers in a single projector array used by the acoustic transmitter and plural transducers in a single hydrophone array used by the acoustic receiver;
    ensonifying a particular geometric space with an acoustic transmitter message emitted from the projector array;
    at plural times $t_1, t_2 \ldots t_z$, receiving echoes from the geometric space via the hydrophone array;
    at each of one or more of the times $t_x$, forming a group of Q receive beams with respective angles of arrival;
    recognizing that at each of the times $t_x$ the Q receive beams of each group have a magnitude $M_{t_x,i}$ where i denotes the $i^{th}$ receive beam;
    for each group of Q receive beams, identifying as a characterizing beam the one or more beams with a largest or next largest magnitudes at each of the times $t_x$; and,
    using the recognized magnitudes as a compressed characterization of the ensonified space.

12. The method of claim 11 wherein the projector array and the hydrophone array are installed on a water-going vehicle.

13. The method of claim 11 wherein for each time $t_x$ the beam with the first largest magnitude $(M_{t_x,i})_{max1}$ is identified as a characterizing beam and data associated with these characterizing beams are used as a compressed characterization of the ensonified space.

14. The method of claim 11 wherein for each time $t_x$ the beams with the first, second . . . N<Q largest magnitudes $(M_{t_x,i})_{max1, max2 \ldots maxN}$ are identified as characterizing beams and data associated with these characterizing beams are used as a compressed characterization of the ensonified space.

15. A method of compressing data from a sonar system comprising the steps of:
    providing an acoustic transmitter and an acoustic receiver, plural transducers in a single projector array used in the acoustic transmitter and plural transducers in a single hydrophone array used in the acoustic receiver;
    ensonifying a particular geometric space with an acoustic transmitter message emitted from the projector array;
    at plural times $t_1, t_2 \ldots t_z$, receiving echoes from the geometric space via the hydrophone array;
    at each of one or more of the times $t_x$, forming a group of Q receive beams with respective angles of arrival;
    recognizing that at each of the times $t_x$ the Q receive beams of each group have a magnitude $M_{t_x,i}$ where i denotes the $i^{th}$ receive beam;
    for each group of Q receive beams, identifying as a characterizing beam the one or more beams with a largest or next largest magnitudes at each of the times $t_x$; and,
    using the recognized magnitudes as a compressed characterization of the ensonified space.

16. The method of claim 15 further comprising:
    forming T subsectors from respective subsets $S_1, S_2 \ldots S_T$ of the Q beams wherein for each time $t_x$ and for each of the T subsectors the subsector beams with the N largest magnitudes $[(M_{t_x,i})_{Tmax1, Tmax2 \ldots TmaxN}]_{Sx}$ are identified as characterizing beams and data associated with these characterizing beams are used as a compressed characterization of an ensonified space.

17. The method of claim 15 wherein the quantity Q may vary at each time $t_x$.

18. The method of claim 15 wherein echo samples at each time $t_x$ are range gated within minimum and maximum altitudes to generate gated echo samples.

19. The method of claim 15 wherein the single projector array is linear and the single hydrophone array is linear; and,
    configuring the projector array orthogonally with respect to the hydrophone array to form a Mills cross such that a projector array transmit beam and multiple hydrophone array receive beams intersect.

20. The method of claim 15 wherein the acoustic transceiver produces n projector signals;
    for each of the n projector signals, the Q beams are generated with a respective beamformer at each time $t_x$;
    for each of the times $t_x$ identifying as characterizing beams one or more beams with the largest or next largest magnitudes $(M_{t_x,i})_{maxn1} \ldots (M_{t_x,i})_{maxnN}$ from among the beamformers' output; and
    using data associated with the characterizing beams as a compressed characterization of the ensonified space.

* * * * *